(12) United States Patent
Quan

(10) Patent No.: US 8,527,268 B2
(45) Date of Patent: Sep. 3, 2013

(54) METHOD AND APPARATUS FOR IMPROVING SPEECH RECOGNITION AND IDENTIFYING VIDEO PROGRAM MATERIAL OR CONTENT

(75) Inventor: Ronald Quan, Cupertino, CA (US)

(73) Assignee: Rovi Technologies Corporation, Santa Clara, CA (US)

( * ) Notice: Subject to any disclaimer, the term of this patent is extended or adjusted under 35 U.S.C. 154(b) by 281 days.

(21) Appl. No.: 12/827,863

(22) Filed: Jun. 30, 2010

(65) Prior Publication Data

US 2012/0005701 A1    Jan. 5, 2012

(51) Int. Cl.
*G10L 15/00* (2006.01)

(52) U.S. Cl.
USPC ............ 704/231; 704/235; 704/246; 704/251

(58) Field of Classification Search
None
See application file for complete search history.

(56) References Cited

U.S. PATENT DOCUMENTS

| | | | |
|---|---|---|---|
| 5,159,631 A | 10/1992 | Quan et al. | |
| 5,214,708 A | 5/1993 | McEachern | |
| 5,471,531 A | 11/1995 | Quan | |
| 6,370,504 B1 | 4/2002 | Zick et al. | |
| 6,462,782 B1 | 10/2002 | Honda et al. | |
| 6,542,200 B1 | 4/2003 | Barcy et al. | |
| 7,277,766 B1 | 10/2007 | Khan et al. | |
| 7,359,900 B2 | 4/2008 | Bogdanov | |
| 7,367,043 B2 | 4/2008 | Dudkiewicz et al. | |
| 7,451,078 B2 | 11/2008 | Bogdanov | |
| 7,595,689 B1 * | 9/2009 | Kenington | 330/149 |
| 8,238,576 B2 | 8/2012 | Cooper et al. | |
| 2003/0074191 A1 | 4/2003 | Byrnes et al. | |
| 2003/0084442 A1 | 5/2003 | Kellner et al. | |
| 2003/0133589 A1 | 7/2003 | Deguillaume et al. | |
| 2003/0179316 A1 * | 9/2003 | Morooka | 348/468 |
| 2005/0146600 A1 | 7/2005 | Chipchase et al. | |
| 2006/0184994 A1 | 8/2006 | Eyer et al. | |
| 2007/0027681 A1 | 2/2007 | Kim | |
| 2007/0053513 A1 | 3/2007 | Hoffberg | |
| 2007/0124789 A1 | 5/2007 | Sachson et al. | |
| 2007/0286499 A1 | 12/2007 | Freiburg et al. | |
| 2007/0294729 A1 | 12/2007 | Ramaswamy | |
| 2007/0299655 A1 | 12/2007 | Laaksonen et al. | |
| 2008/0066138 A1 | 3/2008 | Bishop et al. | |

(Continued)

OTHER PUBLICATIONS

Brezeale, D., et al., "Automatic Video Classification : A Survey of the Literature ", IEEE Transactions on Systems, Man, and Cybernetics, Part C : Applications and Reviews, IEEE Service Center, Piscataway, NJ, USA, vol. 38, No. 3, May 1, 2008, pp. 416-430.

(Continued)

*Primary Examiner* — Hoang-Vu A Nguyen-Ba
(74) *Attorney, Agent, or Firm* — George B. Almeida

(57) ABSTRACT

A system for identification of video content in a video signal is provided via a sound track audio signal. The audio signal is processed with filtering, frequency translation, and or non linear transformations to extract voice signals from the sound track channel. The extracted voice signals are coupled to a speech recognition system to provide in text form, the words of the video content, which is later compared with a reference library of words or dialog from known video programs or movies. Other attributes of the video signal or transport stream may be combined with closed caption data or closed caption text for identification purposes. Example attributes include DVS/SAP information, time code information, histograms, and or rendered video or pictures.

6 Claims, 16 Drawing Sheets

(56) References Cited

U.S. PATENT DOCUMENTS

| | | |
|---|---|---|
| 2009/0030628 A1 | 1/2009 | Simpson |
| 2009/0076821 A1* | 3/2009 | Brenner et al. ............... 704/260 |
| 2009/0094659 A1* | 4/2009 | Candelore ..................... 725/131 |
| 2009/0287486 A1 | 11/2009 | Chang |
| 2010/0048242 A1 | 2/2010 | Rhoads et al. |
| 2010/0058430 A1* | 3/2010 | Jones et al. ................... 725/151 |
| 2010/0077424 A1 | 3/2010 | Ramaswamy et al. |
| 2010/0142824 A1 | 6/2010 | Lu |
| 2010/0318586 A1 | 12/2010 | Wessling |
| 2011/0066437 A1 | 3/2011 | Luff |
| 2011/0173208 A1 | 7/2011 | Vogel |
| 2011/0234900 A1 | 9/2011 | Quan |
| 2011/0289099 A1 | 11/2011 | Quan |
| 2012/0128257 A1 | 5/2012 | Quan |

OTHER PUBLICATIONS

Descriptive Video Service, retrieved from http://en.wikipedia.org/wiki/Descriptive_Video_Service, Apr. 12, 2010, 4 pgs.

Jang, P.J., et al., "Learning to Recognize Speech by Watching Television", IEEE Intelligent Systems, vol. 14, No. 5, Sep./Oct. 1999, pp. 51-58.

Minami, K., et al., "Video Handling with Music and Speech Detection", IEEE Multimedia, IEEE Service Center, New York, NY, USA, vol. 5, No. 3, Jul.-Sep. 1998, pp. 17-25.

International Search Report for International application No. PCT/US2011/041438 mailed Sep. 5, 2011, 2 pgs.

Federal Communications Commission, 47 CFR Ch. 1 (Oct. 1, 2007 Edition), § 15.119, pp. 791-800.

Haskell, Barry G., et al.; Digital Video: An Introduction to MPEG-2; Kluwer Academic Publishers, Boston, Dordrecht, London; 1997; pp. 148-149.

RCA F27647, 27" diagonal Stereo Monitor-Receiver brochure, Form S-F27647, 2000 Thomson Consumer Electronics, Inc., 4 pgs.

Television Broadcasting, Spectrum Management, Broadcast Transmission Standard, BTS-3, Issue 2, Dec. 1997, Canada, 28 pgs.

* cited by examiner

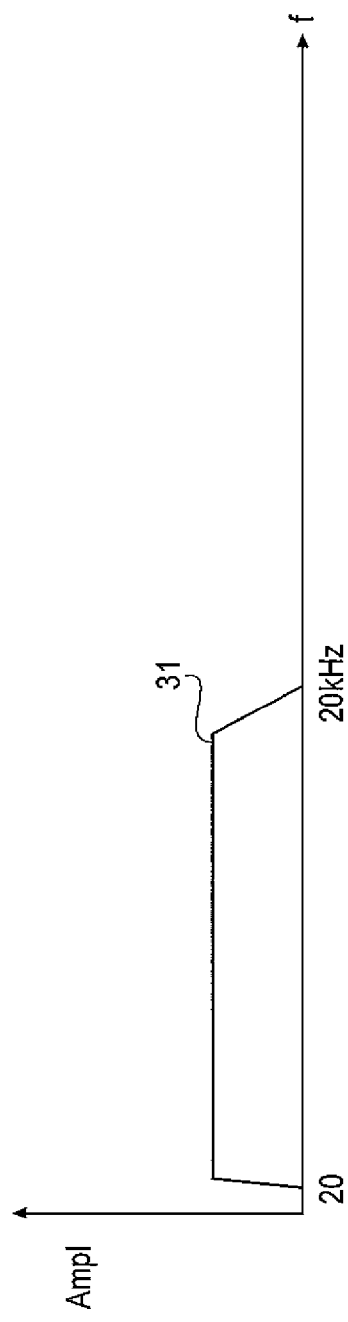
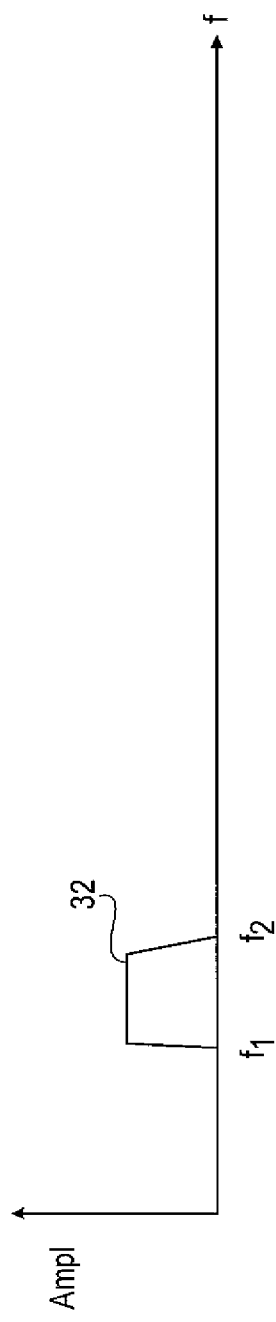
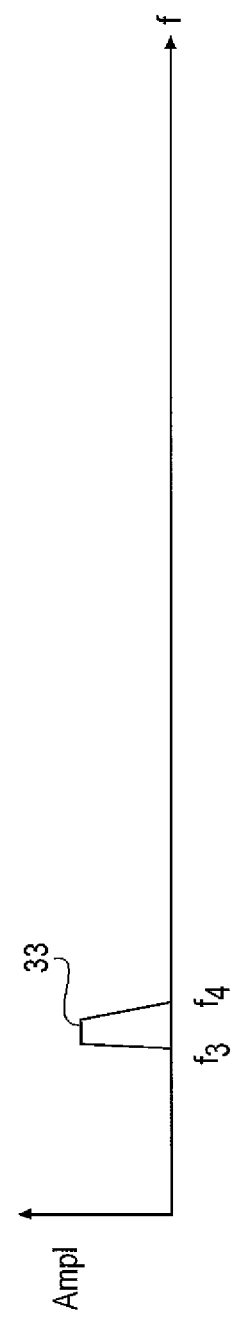

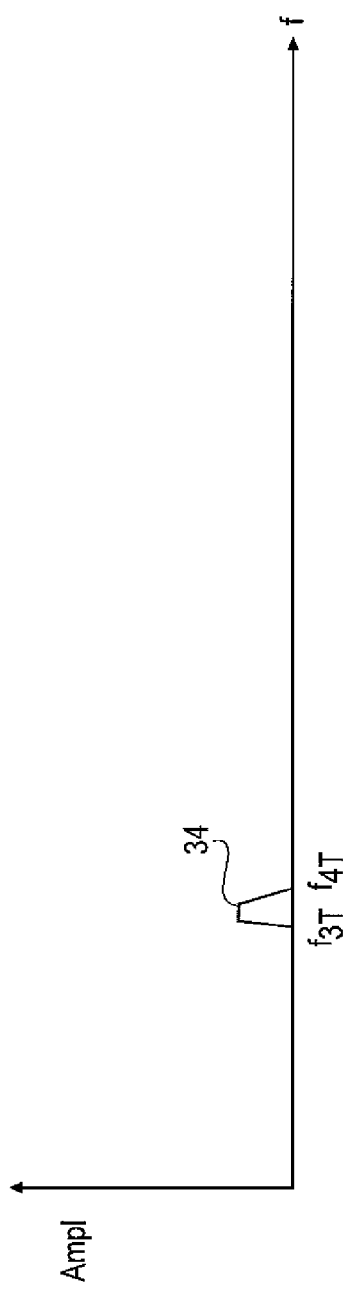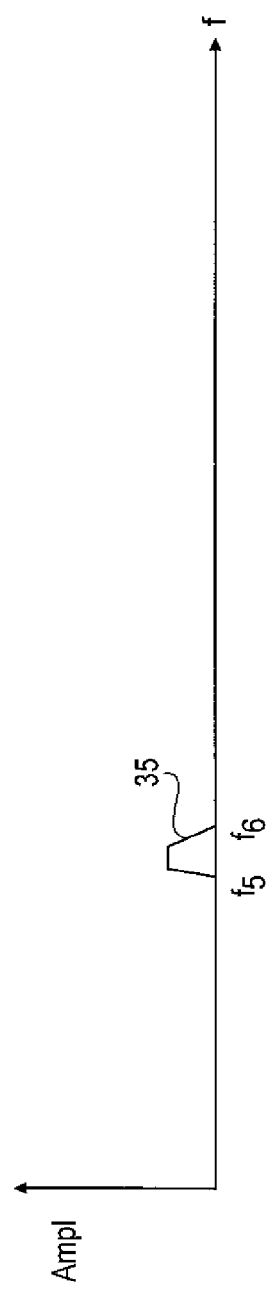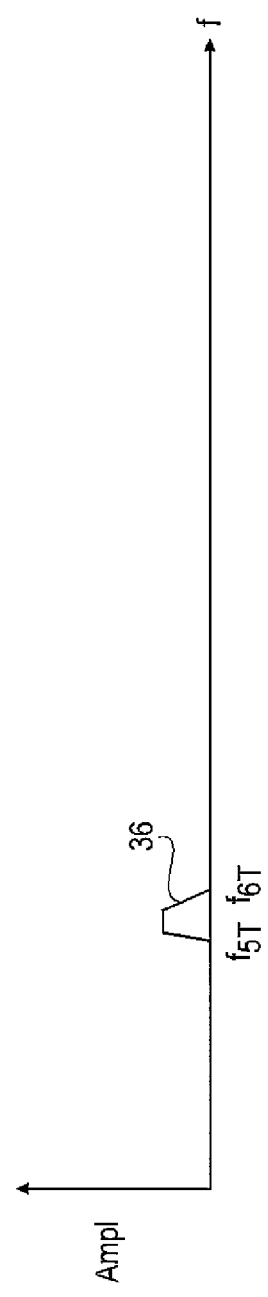

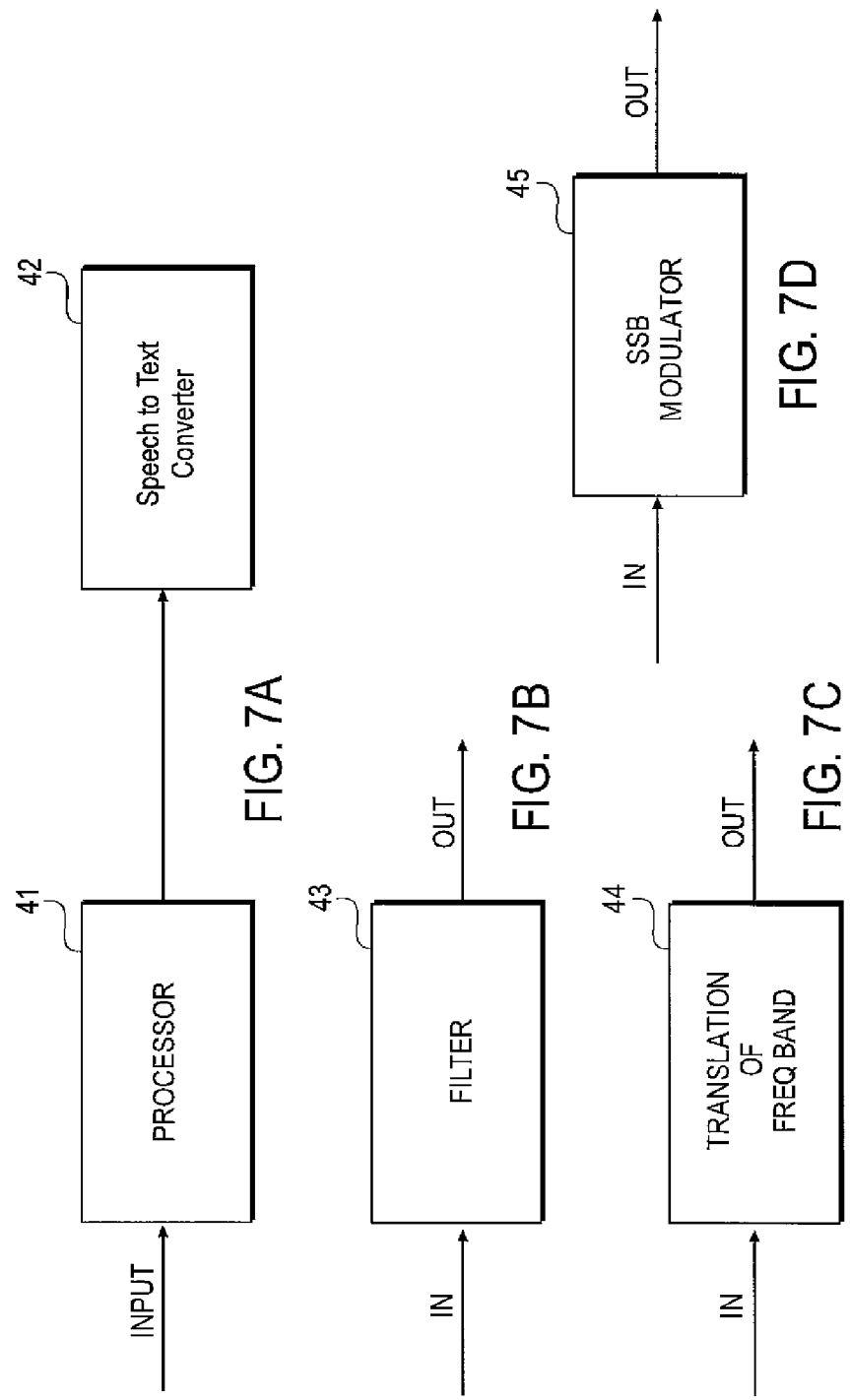

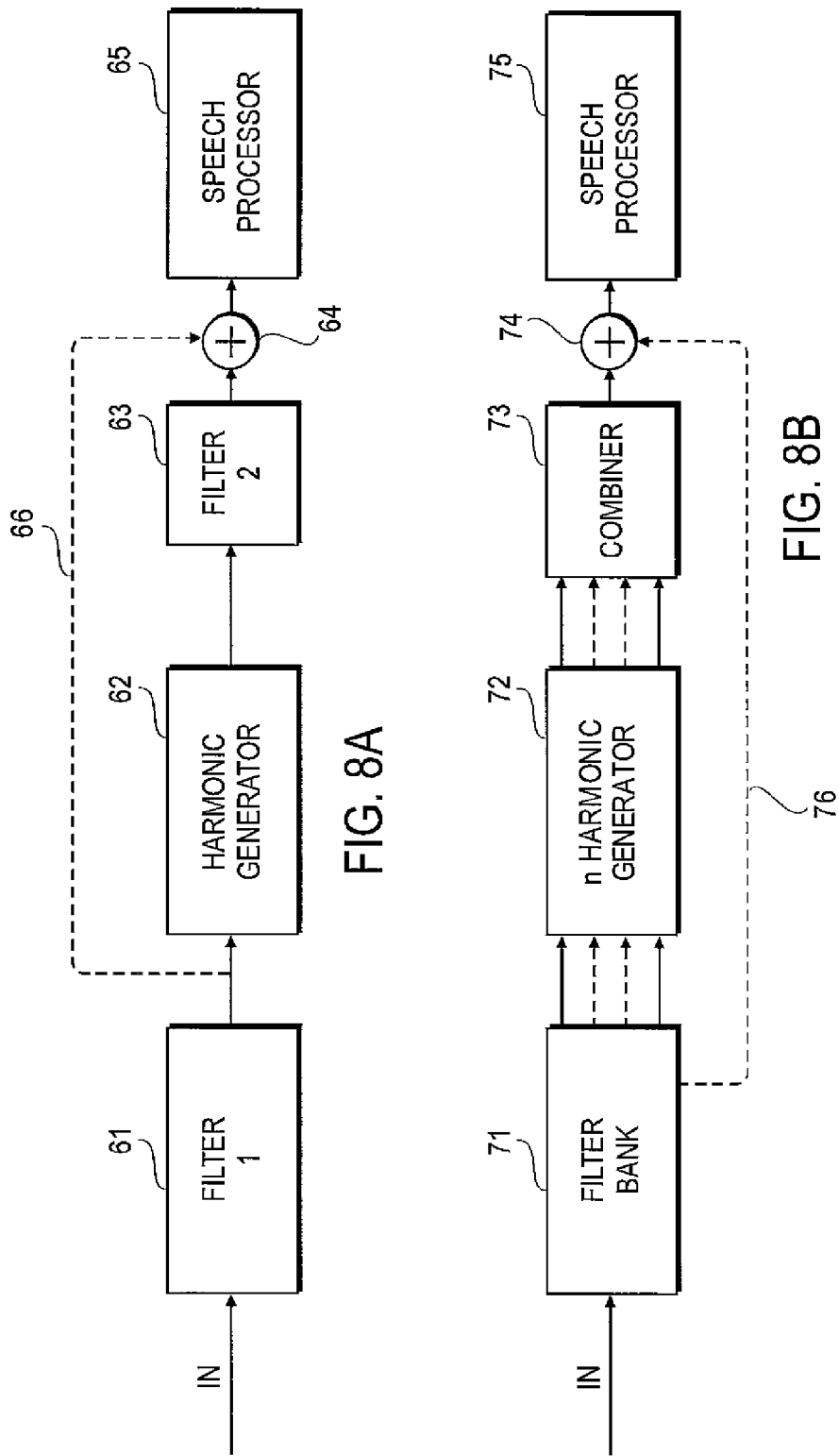

METHOD AND APPARATUS FOR IMPROVING SPEECH RECOGNITION AND IDENTIFYING VIDEO PROGRAM MATERIAL OR CONTENT

BACKGROUND

The present invention relates to identification of video content, e.g., video program material such as movies and or television (TV) programs, via a sound channel.

Previous methods for identifying video content (comprising the sound channel) included watermarking each frame of the video program or adding a watermark to the audio sound track. However, the watermarking process requires that the video content be watermarked prior to distribution and or transmission.

SUMMARY

In some video program material, the dialog from the sound track is substantially dedicated to a particular channel such as a center channel in a multiple sound channel system. This dedicated dialog channel may be processed into text data via a speech processor or voice recognition algorithm. However, in many movies or video programs, the music and voice portions of the sound track are mixed together.

Accordingly, it is an object of the invention to provide a method of separating voices or speech information from the soundtrack, which then can be coupled to a speech processor or voice recognition algorithm for conversion into text. The converted text from a video source or movie is then compared with a library or database of dialog word information of corresponding, known movies or video programs, for identification of the "unknown" video material.

Embodiments of the invention include converting audio signals from the Descriptive Video Service (DVS) or Secondary Audio Program (SAP) to text for identification purposes, and converting an audio signal mixed in with music to text via filtering, modulation, and or nonlinear transformations. Pertaining to the latter method, modulation may include amplitude modulation (e.g., single sideband frequency spectrum translation) and or one or more filters that may include frequency multipliers or distortion generation as part of a system to convert an audio soundtrack signal into text.

Thus, in one embodiment involving modulation, an audio channel or sound track is band pass filtered in a narrow band manner, which may be generally not intelligible to an average listener (e.g., because the band pass audio signal is too low in frequency content so as to provide a muffled effect). By using frequency translation, for example, translating a lower frequency (narrow band) spectrum to a high frequency spectrum, sufficient intelligibility is provided for a person and or for a speech processor (voice recognition), whereby identification of the movie or video program is provided. The narrow band filtering provides rejection from the music of mostly the musical signals or frequencies that are mixed in with the voice information.

Another embodiment involves narrow band pass filtering of the sound track to substantially remove music. However, this narrow band pass filter may include a filter bank of one or more narrower bandwidth filters (each) coupled to one or more distortion generating circuits or nonlinear transformations, to provide harmonics of the frequencies passing through the filter bank. This provides a 're-creation" of lost harmonics of the voice signal to provide intelligibility for voice recognition or speech processing. Accordingly, FIGS. 6A through 9F illustrate various embodiments of the invention pertaining to modulation and or harmonic or distortion generation (nonlinear transformation) for identifying a movie or video program (for example, via processing an audio channel or soundtrack).

Another embodiment provides identification of video content without necessarily altering the video content via fingerprinting or watermarking prior to distribution or transmission. Descriptive Video Service (DVS) or Secondary Audio Program (SAP) data is added or inserted with the video program for digital video disc (DVD), Blu-ray Disc™, or transmission. The DVS or SAP data, which generally is an audio signal, may be represented by an alpha-numeric text code or text data via a speech to text converter (e.g., speech recognition software). Text (data) or speech consumes much less bits or bytes than video or musical signals. Therefore, an example of the invention alternatives may include one or more of the following functions/systems:

- A library or database of DVS or SAP data such as dialog or words used in the video content.
- Receipt and retrieving of DVS or SAP data via a recorded medium or via a link (e.g., broadcast, phone line, cable, IPTV, RF transmission, optical transmission, or the like).
- Comparison of the DVS or SAP data, which may be converted to a text file, to the text data of the library or database.
- Alternatively, the library or database may include script(s) from the video program (e.g., a DVS or SAP script) to compare with the DVS or SAP data (or closed caption text data) received via the recorded medium or link,
- Time code received for audio (e.g., AC-3), and or for video, may be combined with any of the above examples for identification purposes.

In one embodiment, a short sampling of the video program is made, such as anywhere from one TV field's duration (e.g., $\frac{1}{60}$ or $\frac{1}{50}$ of a second) to one or more seconds. In this example, the DVS or SAP signal exists, so it is possible to identify the video content or program material based on sampling a duration of one (or more) frame or field. Along with capturing the DVS or SAP signal, a pixel or frequency analysis of the video signal maybe done as well for identification purposes.

For example, a relative average picture level in one or more section (e.g., quadrant, or divided frame or field) during the capture or sampling interval, may be used.

Another embodiment may include histogram analysis of, for example, the luminance (Y) and or signal color, e.g., (R-Y); and or (B-Y) or I, Q, U, and or V, or equivalent such as Pr and or Pb channels. The histogram may map one or more pixels in a group throughout at least a portion of the video frame for identification purposes. For a composite, S-Video, and or Y/C video signal or RF signal, a distribution of the color subcarrier signal may be provided for identification of a program material. For example a distribution of subcarrier amplitudes and or phases (e.g., for an interval within or including 0 to 360 degrees) in selected pixels of lines and or fields or frames may be provided to identify video program material. The distribution of subcarrier phases (or subcarrier amplitudes) may include a color (subcarrier) signal whose saturation or amplitude level is above or below a selected level. Another distribution pertaining to color information for a color subcarrier signal includes a frequency spectrum distribution, for example, of sidebands (upper and or lower) of the subcarrier frequency such as for NTSC, PAL, and or SECAM, which may be used for identification of a video program. Windowed or short time Fourier Transforms may be used for providing a distribution for the luminance, color, and or subcarrier video signals (e.g., for identifying video program material).

An example of a histogram divides at least a portion of a frame into a set of pixels. Each pixel is assigned a signal level. The histogram thus includes a range of pixel values (e.g., 0-255 for an 8 bit system) on one axis, and the number of pixels falling into the range of pixel values are tabulated, accumulated, and or integrated.

In an example, the histogram has 256 bins ranging from 0 to 255. A frame of video is analyzed for pixel values at each location f(x,y).

If there are 1000 pixels in the frame of video, a dark scene would have most of the histogram distribution in the 0-10 range for example. In particular, if the scene is totally black, the histogram would have a reading of 1000 for bin 0, and zero for bins 1 through 255. Of course the number of bins may include a group of two or more pixels.

Alternatively, in the frequency domain, Fourier, DCT, or Wavelet analysis may be used for analyzing one or more video field and or frame during the sampling or capture interval.

Here the coefficients of Fourier Transform, Cosine Transform, DCT, or Wavelet functions may be mapped into a histogram distribution.

To save on computation, one or more field or frame may be transformed to a lower resolution picture for frequency analysis, or pixels may be averaged or binned.

Frequency domain or time or pixel domain analysis may include receiving the video signal and performing high pass, low pass, band eject, and or band pass filtering for one or more dimensions. A comparator may be used for 'slicing" at a particular level to provide a line art transformation of the video picture in one or two dimensions. A frequency analysis (e.g., Fourier or Wavelet, or coefficients of Fourier or Wavelet transforms) may be done on the newly provided line art picture. Alternatively, since line art pictures are compact in data requirements, a time or pixel domain comparison between the library's or data base's information may be compared with a received video program that has been transformed to a line art picture.

The data base and or library may then include pixel or time domain or frequency domain information based on a line art version of the video program, to compare against the sampled or captured video signal. A portion of one or more fields or frames may be used in the comparison.

In another embodiment, one or more fields or frames may be enhanced in a particular direction to provide outlines or line art. For example, a picture is made of a series of pixels in rows and columns. Pixels in one or more rows may be enhanced for edge information by a high pass filter function along the one dimensional rows of pixels. The high pass filtering function may include a Laplacian (double derivative) and or a Gradient (single derivative) function (along at least one axis). As a result of performing the high pass filter function along the rows of pixels, the video field or frame provides more clearly identified lines along the vertical axis (e.g., up-down, down-up), or perpendicular or normal to the rows.

Similarly, enhancement of the pixels in one or more columns provides identified lines along the horizontal axis (e.g., side to side, or left to right, right to left), or perpendicular or normal to the columns.

The edges or lines in the vertical and or horizontal axes allow for unique identifiers for one or more fields or frames of a video program. In some cases, either vertical or horizontal edges or lines are sufficient for identification purposes, and using one axis requires less (e.g., half) computation for analysis than analyzing for curves of lines in both axes.

It is noted that the video program's field or frame may be rotated, for example, at an angle in the range of 0-360 degrees, relative to an X or Y axis prior or after the high pass filtering process, to find identifiable lines at angles outside the vertical or horizontal axis.

BRIEF DESCRIPTION OF THE FIGURES

FIG. 6A shows a graph illustrating a typical audio spectrum of sound track.

FIG. 6B shows a graph illustrating a typical audio spectrum of speech within a sound track.

FIG. 6C shows a graph illustrating a (first) sub-band of the spectrum of speech signals in accordance with the invention.

FIG. 6D shows a graph illustrating a translated frequency spectrum of a (first) sub-band of frequencies.

FIG. 6E shows a graph illustrating a (second) sub-band of the spectrum of speech signals.

FIG. 6F shows a graph illustrating a translated frequency spectrum of a (second) sub-band of frequencies.

FIG. 7A is a block diagram of a general illustration of an embodiment of the invention.

FIG. 7B is a block diagram illustrating a filter (band-pass, low pass, high pass, comb, reject), which may be used as part of any of the embodiments for processing a sound track or audio channel.

FIG. 7C is a block diagram illustrating a frequency translator (e.g., IQ modulator, AM system, Weaver single side band processor, or digital signal processor).

FIG. 7D is a block diagram illustrating a single side band modulator (e.g., double side band modulation with filtering one of the sidebands, IQ modulator, Weaver Modulator, DSP, digital signal processing).

FIG. 8A is a block diagram illustrating an embodiment of the invention including a harmonic or distortion generator.

FIG. 8B is a block diagram illustrating an embodiment of the invention including a filter bank.

DETAILED DESCRIPTION

Figure 1:
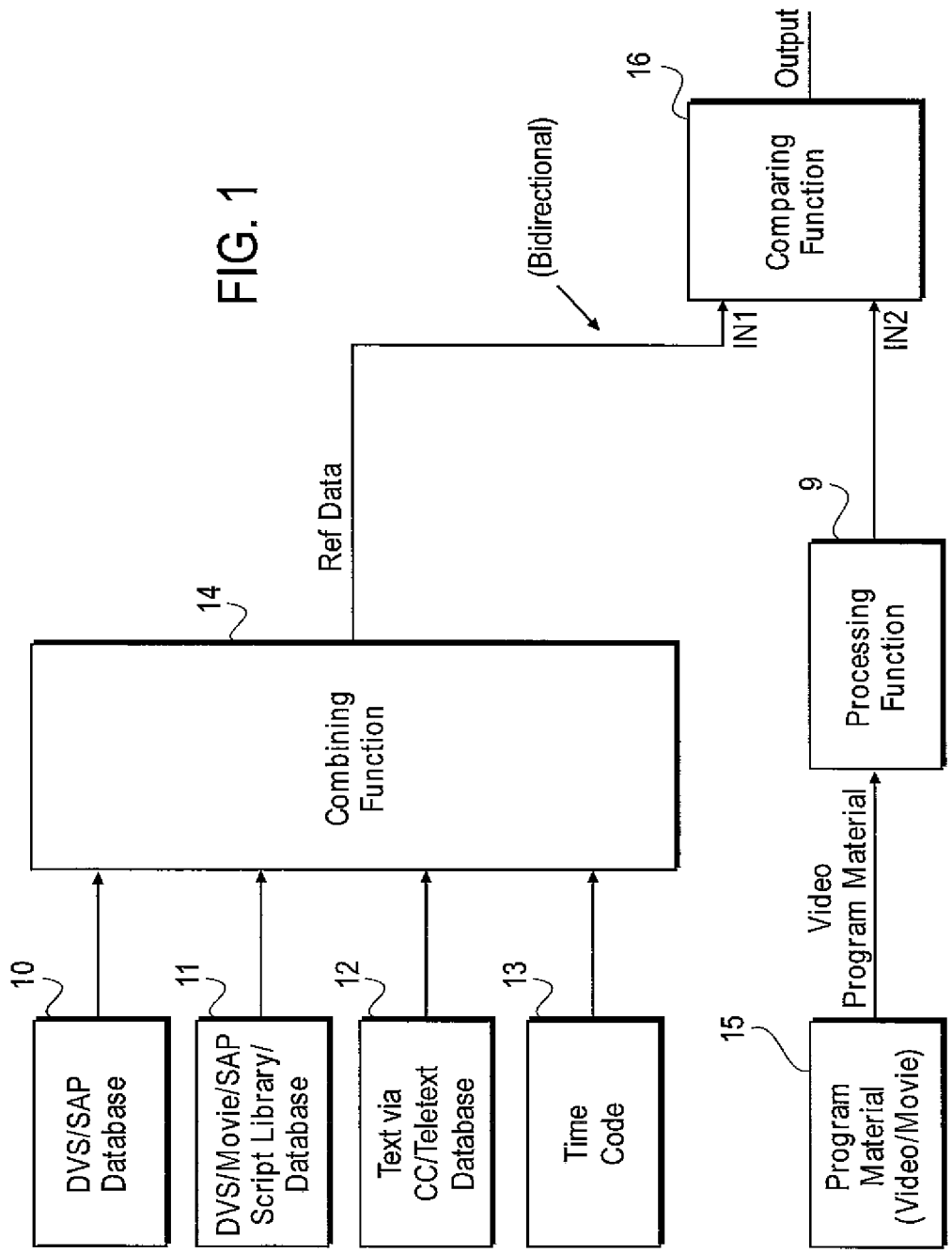
FIG. 1 is a block diagram illustrating an embodiment of the invention utilizing alpha and or numerical text data.

FIG. 1 illustrates an embodiment of the invention for identifying program material such as movies or television programs. A system for identifying program material includes DVS/SAP signals from a DVS/SAP database 10. Database 10 includes Short Time Fourier Transforms (STFT) or a transform of the audio signals of a Descriptive Video Service (DVS) or Secondary Audio Program (SAP) signal. A library is built up from these transforms that are tied to particular movies or video programs, which can then be compared with received program material from a program material source 15 for identification purposes. The system in FIG. 1 may (further) include a DVS/SAP (and or movie) script library database 11, which includes (text) descriptive narration and or dialog of the performers, a closed caption data base or text data base from closed caption signals, and or time code that may be used to locate a particular phrase or word during the program material.

The DVS/SAP/movie script library/database 11 includes (descriptive) narration (e.g., in text) and or the dialogs of the characters of the program material. The (DVS or SAP text) scripts may be divided by chapters, or may be linked to a time line in accordance with the program (e.g., movie, video program). The stored (DVS or SAP text) scripts may be used for later retrieval, for example, for comparison with DVS/SAP scripts from a received video program or movie, for identification purposes.

A text or closed caption data base 12 includes text that is converted from closed caption or the closed caption data signals, which are stored and may be retrieved later. The closed caption signal may be received from a vertical blanking interval signal or from a digital television data or transport stream (e.g., such as MPEG-x)

Time code data 13, which is tied or related to the program material, provides another attribute to be used for identification purposes. For example, if the program material has a DVS narrative or closed caption phrase, word or text of "X" at a particular time, the identity of the program material can be sorted out faster or more efficiently. Similarly, if at time "X" the Fourier Transform (or STFT) of the DVS or SAP signal has a particular profile, the identity of the program can be sorted out faster or more accurately.

The information from blocks 10, 11, 12, and or 13 is supplied to a combining function (depicted as block 14), which generates reference data. This reference data is supplied to a comparing function (depicted as block 16). The comparing function 16 also receives data from program material source 15 by way of processing function 9, which data may be a segment of the program material (e.g., 1 second to >1 minute). Video data from source 15 may include closed caption information, which then may be compared to DVS/SAP signals, DVS/SAP text, closed caption information or signals from the reference data, supplied via the closed caption database 12, DVS/SAP/movie script library or database 11, or via the DVS/SAP database 10. Time code information from the program material source 15 and processing function 9 may be included and used for comparison purposes with the reference data.

Processing function 9 may include a processor to convert a DVS/SAP/LFE (low frequency effect) signal from the program video signal or movie of program material source 15 into frequency components (spectral analysis) such as DCT (Discrete Cosine Transform), DFT (Discrete Fourier Transform), Wavelets, FFT (Fast Fourier Transform), STFT (Short Time Fourier Transform), FT (Fourier Transform), or the like. The frequency components such as frequency coefficients of the DVS/SAP/LFE audio channel(s) are then compared, via comparing function 16, to frequency components (coefficients) of known movies or video programs for identification. Time code also may be used to associate a time when the specific frequency components occurred for the library reference (13) and for the received video or movie from source 15, for identification purpose(s).

In another embodiment of the invention, processor 9 may include a speech to text processor for converting DVS/SAP (audio) signals from video or movie source 15 to text. This converted text associated with words from the DVS or SAP channel is compared via comparing function 16 to a library/database 11 of DVS/SAP text from known movies or video programs. The library/database 11 for example, may include transcribed text from listening to the DVS/SAP channel(s) or from converting the audio signal of the DVS/SAP channel(s) to text (via a computer algorithm) for known (identified) video programs or movies.

Processing function 9 may then include a time (domain) signal to frequency (domain) component converter and or an audio signal to text converter, for example, for identification purposes.

Yet another embodiment of the invention includes a configuration wherein the processing function 9 reads or extracts closed caption and or time code (or teletext) data from the video signal (movie or TV program) received from the program material source 15. A portion or all of the closed caption and or time code (or teletext) data is compared with the (retrieved) reference (library) data via the blocks 14, 13, and or 12.

Thus, in one embodiment, processing function 9 may process or transform any combination of time code, close caption, teletext, DVS, and or SAP data or signals. For example, the processing may include extracting, reading, converting audio to text, and or performing (frequency) transformations (e.g., STFT, FT, DFT, FFT, DCT, Wavelets or Wavelet Transform, etc.).

Figure 3:
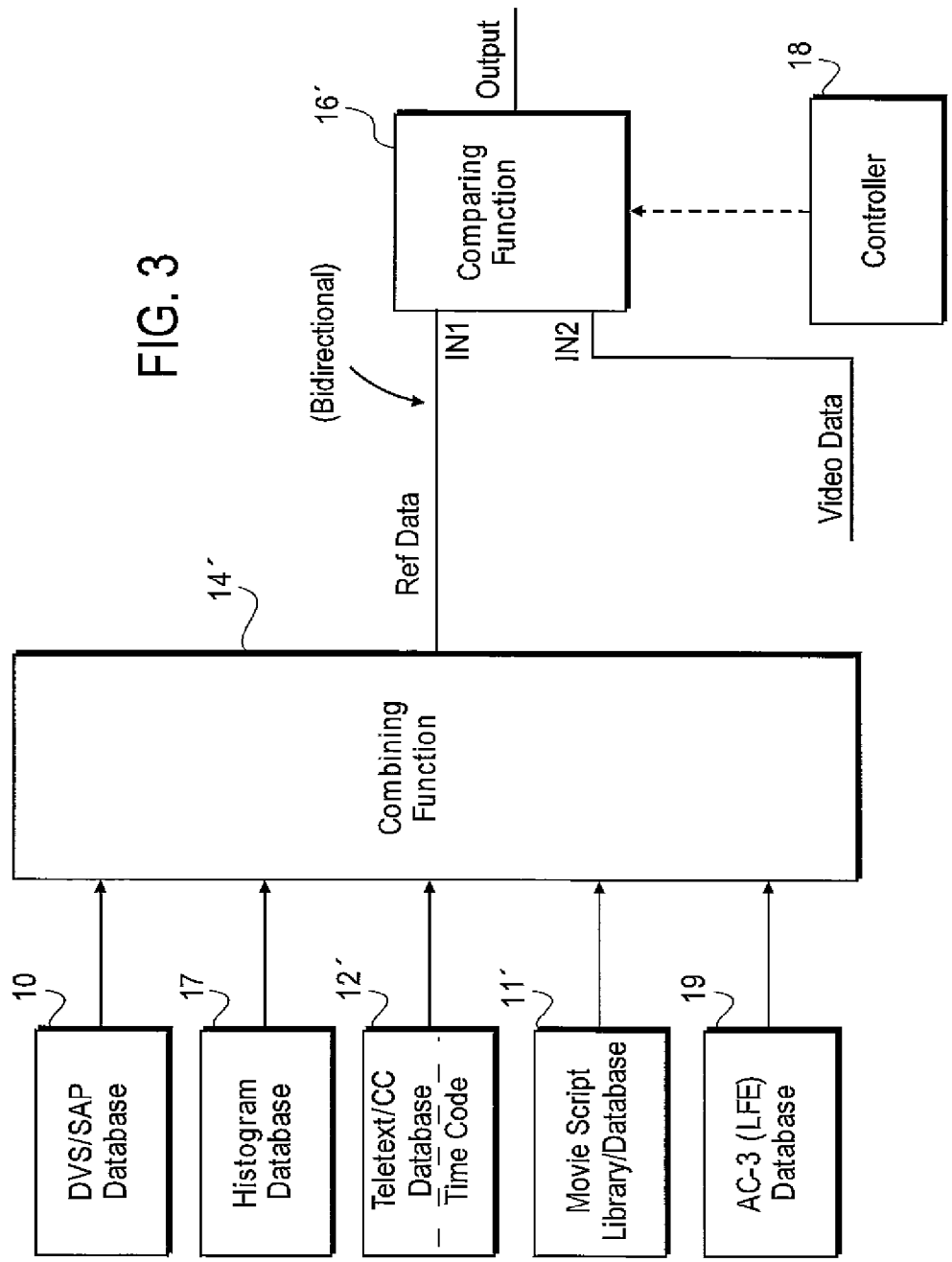
FIG. 3 is a block diagram illustrating an alternative embodiment of the invention utilizing any combination of histogram, DVS/SAP, closed caption, teletext, time code, and or a movie/program script data base.

Performing transformations may be done on (received) program material from source 15 including DVS/SAP and or one or more channels of the audio signal, e.g., AC-3, 5.1 channel or LFE (Low Frequency Effects) such as in FIG. 3. A library or database containing the identified or known transformations of the audio signal then is used for comparing, via comparing function 16, to the program material from source 15, for identifying the received ("unknown") program material.

The comparing function 16 may include a controller and or algorithm to search, via the reference data, incoming information or signals such as, for example, DVS/SAP or closed caption signals or text information from the program material source 15.

The output of the comparing function 16, after one or more segments, is analyzed to provide an identified title or other data (names of performers or crew) associated with the received program material.

Figure 2:
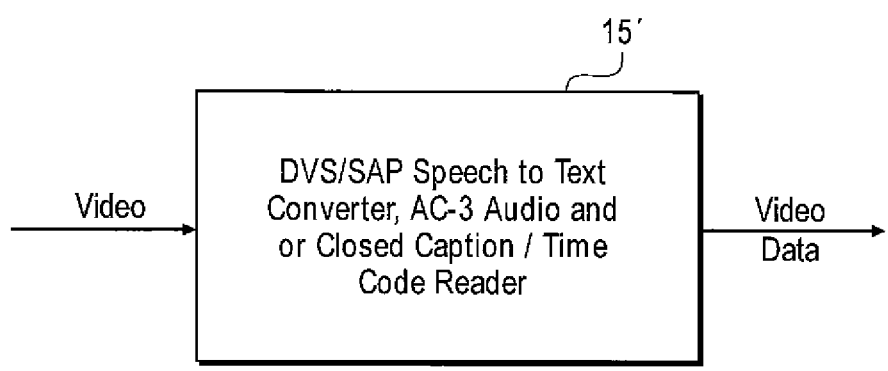
FIG. 2 is a block diagram illustrating another embodiment of the invention utilizing one or more data readers or converters.

FIG. 2 illustrates a video source 15', which may be an analog or digital source, such as illustrated by the program material source 15 of FIG. 1. For an analog source, the DVS or SAP signal is an analog audio signal. For example, the DVS signal may be a band limited audio signal that generally is limited to the spoken words without special effects or music. Because of this limitation to just speech, the DVS channel(s) allows for easier translation from audio to text via a speech recognition algorithm. That is, for example, a speech recognition system is not "confused" with music or special effects sounds.

For a digital video source, the DVS or SAP audio signal may be in a digitized form or in discrete time. As mentioned above, this digitized DVS/SAP audio signal may be converted to text via a speech to text converter (e.g., via speech recognition software). Another source for identification may include sound channels of the Dolby AC-3 Surround Sound 5.1 system. For example, the 5.1 channel or LFE (Low Frequency Effect(s)) channel may be analyzed via STFT or other transforms. Since the LFE channel is limited to special or sound effects in general, a particular movie will tend to have a particular sound effect or special effect, which provides means for identification. One example inserts any of the signals mentioned in an MPEG-x or JPEG 2000 bit stream. The digital video signal may be provided from recorded media such as a CD, DVD, Blu-ray Disc™, hard drive, tape, or solid state memory. Transmitted digital video signals may be provided via a digital delivery network, LAN, Internet, intranet, phone line, WiFi, WiMAX™, cable, RF, ATSC, DTV, and or HDTV.

The program material source 15' for example includes a time code, closed caption, DVS/SAP, and or teletext reader for reading the received digital or analog video signal. It should be noted that closed caption and or time code may be embedded in a portion of the vertical blanking interval of a TV signal (e.g., analog), or in a portion of the MPEG-x or JPEG 2000 data (transport) stream.

The output of the reader(s) thus includes a DVS/SAP, time code, closed caption, and or teletext signal, (which may be converted to text symbols) for comparing against a database or library for identification purpose(s). The output of source 15' may include information related to STFT or Fourier transforms of the DVS/SAP, AC-3 (LFE), and or closed caption signal. This STFT or equivalent information is used for comparison to a database or library for identification purposes.

FIG. 3 illustrates an alternative embodiment of the invention, which includes histogram information from a histogram database 17, information from DVS/SAP 10, and or information from a Dolby Surround Sound AC-3 5.1 or LFE (Low Frequency Effect(s)) channel. A database representing the STFT or equivalent transform on the LFE channel of one or more movies or video programs is illustrated as database 19. As mentioned in FIG. 1, block 10 represents a database for DVS/SAP information for one or more movies or video programs. This DVS/SAP information may be in the form of STFT or equivalent transform or (converted) text (via speech recognition) for one or more movies or video programs. For identifying a movie or program, any combination of LFE information, histogram, DVS/SAP, teletext, time code, closed caption, and or (movie) script may be used.

Histogram information may include pixel (group) distribution of luminance, color, and or color difference signals. Alternatively, histogram information may include coefficients for cosine, Fourier, and or Wavelet transforms. The histogram may provide a distribution over an area of a video frame or field, or over specific lines/segments (of for example any angle or length), rows, and or columns.

For example, for each movie or video program stored in a database or library, histogram information is provided for at least a portion of a set of frames or fields or lines/segments. A received video signal then is processed to provide histogram data, which is then compared to the stored histograms in the database or library to identify a movie or video program. With the data from closed caption, time code, or teletext combined with the histogram information, identification of the movie or video program is provided, which may include a faster or more accurate search.

The histogram may be sampled every N frames to reduce storage and or increase search efficiency. For example, sampling for pixel distribution or coefficients of transforms in a periodic but less than 100% duty cycle, allows more efficient or faster identification of the video program or movie.

Similarly in the MPEG-x or compressed video format, information related to motion vectors or change in a scene may be stored and compared against incoming video that is to be identified. Information in selected P frames and or I frames may be used for the histogram for identification purposes.

In some video transport streams, pyramid coding is done to allow providing video programming at different resolutions. In some cases lower resolution representation of any of the video fields or frames may be utilized for identification purposes, which requires less storage and or provides more efficient or faster identification.

Radon transforms may be used as a method of identifying program material. In the Radon transform, lines or segments are pivoted or rotated on an origin, for example (0,0) for $(\omega 1, \omega 2)$ of the plane of two dimension Fourier or Radon coefficients. By generating the Radon transform for specific discrete angles such as fractional multiples of $\pi$, $(k\pi)$ where $k<1$ and a rational or real number, the number of coefficients of the video picture's frame or field calculations is reduced. By using an inverse Radon transform, an approximation of a selected video field or frame is reproduced or provided, which can be used for identification purposes.

The coefficients of the Radon transform as a function of an angle may be mapped into a histogram representation, which can be used for comparison against a known database of Radon transforms for identification purposes.

FIG. 3 illustrates, via the block 17, a histogram database of video programs or movies coupled to a combining function, for example, combining function 14'. Since the circuits of FIG. 3 are generally similar to those of FIG. 1, like components in FIG. 3 are identified by similar numerals, with addition of a prime symbol for components with some differences. Also coupled to the combining function 14' is a database 12' for providing teletext, closed caption, and or time code signals, database 10 providing DVS/SAP information, and or database 19 providing AC-3 LFE information. A script library or database 11' also may be coupled to combining function 14'. Any combination of the blocks 17, 12', 10, 19, and or 11' may be used via the combining function 14' as reference data for comparison, via a comparing function 16', against a video data signal supplied to an input IN2 of function 16', to identify a selected video program or movie. A controller 18 may retrieve reference data via the blocks 14', 17, 12', 10, 19, and or 11' when searching for a closest match to the received video data signal.

The video program or movie may be provided via a video source and processing function such as, for example program material source 15 and processing function 9 of FIG. 1.

Thus, an embodiment of the invention includes for example an identifying system for movies or video programs comprising a library or database, a processor for the "unknown" video program, and or a comparing function to initiate the identification process. The library or database may be any combination of transformations (e.g., frequency transformations or transforms) of audio signals including LFE, SAP, DVS, and or of a library of text based information, or alpha-numeric data/symbols from any combination of teletext, closed caption, time code, and or speech to text from a DVS/SAP/soundtrack. The identifying system may include a processor to receive or extract teletext, time code, closed caption data from the "unknown" movie or video program, or may include a processor to convert an audio data or signal to a text data signal taken from the DVS/SAP channel of the "unknown" movie or video program. The identifying system may include a processor for providing a frequency transformation (or transforms) of the SAP/DVS/LFE channel from the "unknown" movie or video program. The comparing function (part of the identifying system) then compares any combination of time code, teletext, text from DVS/SAP, and or (any combination of) frequency transformations from DVS/SAP/LFE, between a (known reference) library/database and the "unknown" movie or video program, to identify the "unknown" movie or video program.

Figure 4:
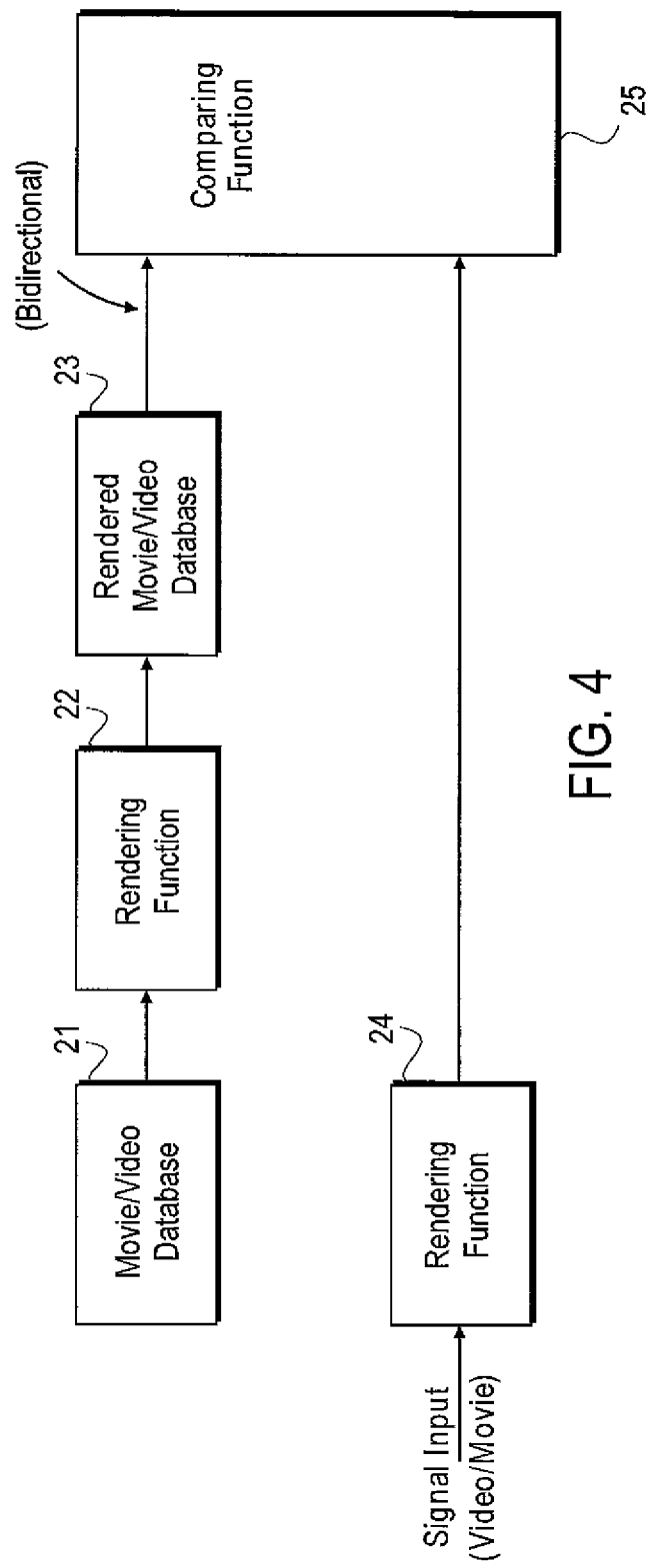
FIG. 4 is a block diagram illustrating an embodiment utilizing a rendering transform or function.

FIG. 4 illustrates an alternative embodiment for identifying movies or video programs. A movie or video database 21, is rendered via rendering function or circuit 22 to provide a "sketch" of the original movie or video program. For example, a 24 bit color representation of a video frame or field is reduced to a line art picture in color or black and white. The line art picture provides sufficient details or outlines of selected frames or fields of the video program for identification purposes, while reducing required storage space. The rendered movie or video programs are stored in a database 23 for subsequent comparison with a received video program. A first input of a comparing function or circuit 25 is coupled to the output of the rendered movie or video program database 23. The received video program is also rendered via a rendering function or circuit 24 and coupled to the comparing function or circuit 25 via a second input.

An output of the comparing function or circuit 25 provides an identifier for the video signal received by the rendering function or circuit 24.

Figure 5B:
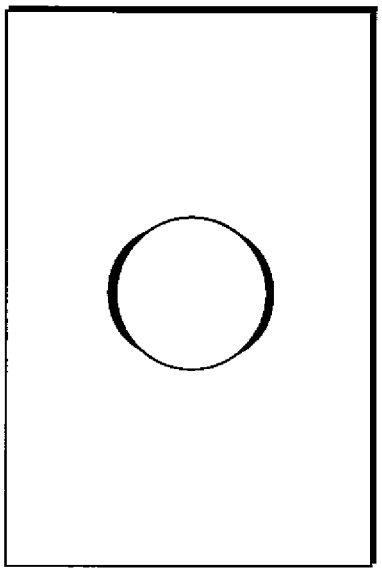
FIGS. 5A-5D are pictorials illustrating examples of rendering.
Figure 5D:
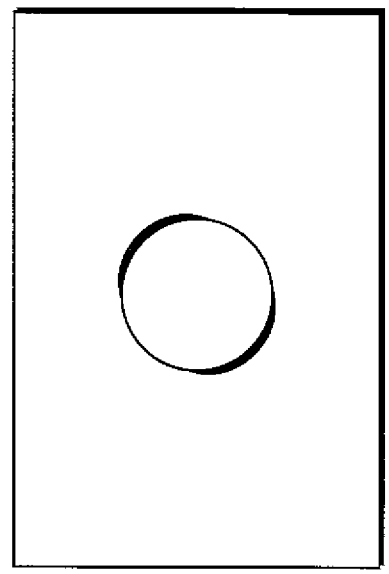
Figure 5A:
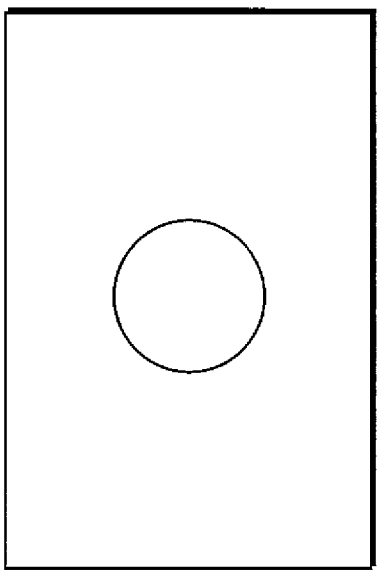
Figure 5C:
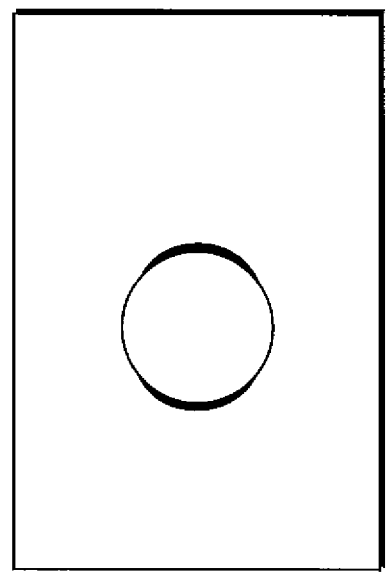

FIG. 5A, FIG. 5B, FIG. 5C, and/or FIG. 5D illustrate an example of rendering, which may be used for identification purposes. FIG. 5A shows a circle prior to rendering.

FIG. 5B shows the circle rendered via a high pass filter function (e.g., gradient or Laplacian, single derivative or double derivative) in the vertical direction (e.g., y direction). Here, edges conforming to a horizontal direction are emphasized, while edges conforming to an up-down or vertical direction are not emphasized. In video processing, FIG. 5B represents an image that has received vertical detail enhancement.

FIG. 5C represents an image rendered via a high pass filter function in the horizontal direction, also known as horizontal detail enhancement. Here, edges conforming to an up-down or vertical direction are emphasized, while edges in the horizontal direction are not.

FIG. 5D represents an image rendered via a high pass filter function at an angle relative to the horizontal or vertical direction. For example, the high pass filter function may apply horizontal edge enhancement by zigzagging pixels from the upper left corner or lower right corner of the video field or frame. Similarly zigzagging pixels from the upper right corner or lower left corner and applying vertical edge enhancement provides enhanced edges at an angle to the X or Y axes of the picture.

By using thresholding or comparator techniques to pass through the enhanced edge information on video programs, profiles of the location of the edges are stored for comparison against a received video program rendered in substantially the same manner. The edge information allows a greater reduction in data compared to the original field or frame of video.

The edge information may include edges in a horizontal, vertical, off axis, and or a combination of horizontal and vertical direction(s), which may be used for identification purposes.

FIG. 6A is a graph illustrating a typical frequency range 31 of a high fidelity sound track, which extends from 20 Hz to 20,000 Hz. Other frequency ranges may be narrower or wider depending on the playback system. For instance, 50 Hz to 15,000 Hz is considered high fidelity for TV broadcasting in the past (e.g., analog transmission). Within this wide range of the frequency spectrum, music and voice signals are included. For speech processing or recognition, the spectrum of the speech or voice signals is masked or interfered with by music.

FIG. 6B is a graph illustrating a typical voice frequency spectrum 32 between frequencies f1 and f2. For example, f1=100 Hz and f2=3500 Hz. A typical voice spectrum of about 3400 Hz bandwidth may be too wide to allow separating music from voice. Instead, a narrower bandwidth such as 1.8 KHz to 2 KHz is usually sufficient for intelligibility purposes, and this bandwidth will further separate the voice from the music signals. This narrow audio bandwidth signal (1.8 KHz to 2 KHz) may be coupled to a voice recognition or speech processor system for conversion into text in an embodiment.

FIG. 6C illustrates an embodiment having a more restrictive bandwidth 33 for voice, which provides further separation of voice signals from music, for coupling into a speech recognition algorithm. For example, the typical bandwidth (f4−f3) may be below 1.8 KHz such as 1.2 KHz to 1.6 KHz (e.g., f4=1.3 KHz to 1.7 KHz, f3=100 Hz).

FIG. 6D illustrates an embodiment having a frequency translation of the voice audio spectrum of FIG. 6C via spectrum 34, which can provide improved characteristics for the speech recognition algorithm. For example f3T=f3+translation frequency and or f4T=f4+translation frequency. In this example, the pitch of the narrow bandwidth voice spectrum is translated up and coupled to a speech or voice recognition system for text conversion. A typical (upward) translation frequency is in the range of 0 Hz to about 500 Hz.

FIG. 6E shows a narrow band audio spectrum 35 residing in a higher band of frequencies than illustrated in FIG. 6C (spectrum 33). Thus, f5>f3 and or f6>f4. The band of frequencies 35 may be indicative of voices of a higher pitch (children) or normal pitch (adults), which may be coupled to a speech or voice recognition system for converting into text.

FIG. 6F shows a (downward) translated spectrum 36 of the narrow band spectrum of FIG. 6E. For example, the frequencies f5T=f5−translation frequency and or f6T=f6−translation frequency. A typical (downward) translation frequency is in the range of 0 Hz to about 1000 Hz.

FIG. 7A illustrates a general block diagram of an embodiment of the invention. Audio from a video program or movie is coupled to the input of a processor 41, which includes frequency translation circuitry (digital and or analog domain) and or a distortion generation system. The output of processor 41 is then coupled to a speech to text converter 42.

FIG. 7B illustrates an example filter 43, which may be used in limiting the bandwidth of an audio signal, such as shown in any of FIGS. 6B through 6F, or used in the implementation of the frequency translation and or distortion generation system. Filter 43 may be implemented in software, firmware, DSP (Digital Signal Processing), and or in the analog domain.

FIG. 7C shows an illustration of a frequency translation system 44, which may translate a set of frequencies or band of frequencies up and or down. Generally, system 44 includes one or more signal multiplier(s) and filter(s). For example, a double sideband amplitude modulator (suppressed or unsuppressed carrier) coupled to a filter (e.g., bandpass, highpass, reject, and or lowpass) to provide a frequency translated version (translated upward or downward). Generally, an audio signal is provided to the input of the system 44, which provides a frequency translated output from system 44 via its amplitude modulators and or multiplier function and filters. U.S. Pat. No. 5,471,531 by Quan, incorporated by reference, discloses the use of two carriers to produce a difference frequency as the translation frequency.

FIG. 7D illustrates another frequency translation system using a single sideband modulator 45. Here, the single side band (SSB) system comprises an IQ modulator (0 degree carrier and 90 degree carrier provided to the carrier inputs of the modulator). The SSB system includes a Hilbert transform of the audio signal to provide an audio signal, of relative phases 0 degrees and 90 degrees, into the audio inputs of the IQ multipliers or modulators. Frequency translation is provided depending on whether a summing or subtracting process is provided via the (IQ) output of the two multipliers. U.S. Pat. No. 5,159,631 by Quan et al, incorporated by reference, discloses a method of direct frequency translation of audio signals in the up or down direction.

Figure 7E:
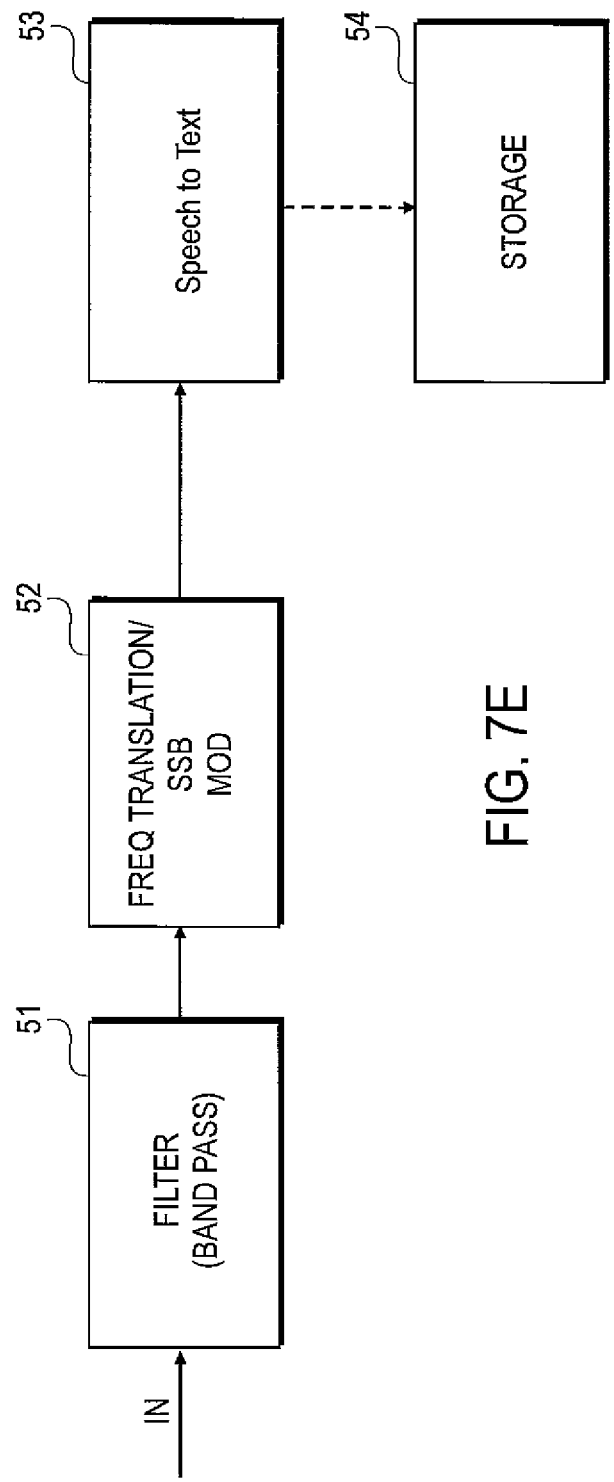
FIG. 7E is a block diagram illustrating an embodiment of the invention including (spectrum) frequency translation.

FIG. 7E illustrates another embodiment whereby audio from a movie or television program is coupled to a filter 51, typically a very narrow band filter. The output of filter 51 is coupled to a frequency translation system 52, which includes modulation function(s) and typically includes any combination of an all pass, or phase shifting network or system, low pass, band pass, and or high pass filtering function or circuit. The output of system 52 is coupled to a speech to text converter 53, for example, speech recognition software. Text information from converter 53 may be coupled to a storage device 54 for retrieval purposes.

FIG. 8A illustrates a system for providing signal processing of a narrow band audio signal to reproduce harmonics of the fundamental frequencies of voice signals for enabling voice recognition. The narrow band audio signal is derived from a sound track or audio channel via a first filter 61, which may have less than a 1.8 KHz bandwidth. The output of the filter 61 is then coupled to a harmonic generator 62 (e.g., nonlinear transformation) to synthesize one or more harmonics from the output signal of filter 61. For example, the narrow band filtering from filter 61 allows more rejection of other signals such as music. Since voice fundamental frequencies of adults range from about 120 Hz to about 240 Hz, it is possible to provide, in one example of filter 61, a band pass filter of frequencies from about 100 Hz to 300 Hz for the pass band. The output of this exemplary 100 Hz to 300 Hz filter is then coupled to the harmonic generator 62 to reproduce nth order harmonic(s) up to about 2 KHz or to 3 KHz. Although the temper, or pitch, of the voice may be changed from its original, the summation of the fundamental frequencies from the output of filter 61 plus the synthesized harmonics of harmonic generator 62 combine to provide a "voice" suitable for speech recognition. The harmonic generator 62 provides a weighted coefficient (scalar value) for any set of harmonics from 1 to N. Note the first order harmonic is defined as the fundamental frequency. That is, in one example, the harmonic generator (passes) combines the output of filter 61 with (scalar multiplied) harmonics of signals from filter 62. The output of generator 62 is coupled to a second filter 63 to remove any extraneous distortion products that may hamper speech recognition (e.g., low frequency distortion below 100 Hz, and or high frequency distortion above>1.8 KHz). Filter 63 may also include equalization to shape the voice temper prior to coupling, via a summing function 64, to a speech recognition processor 65, which converts the speech to text.

Alternatively, any portion or all of the voice and/or audio spectrum provided via the filter 61 may be combined with weighted sums of harmonics (as illustrated by dashed line 66), to provide an audio signal for the speech recognition processor 65 for conversion to text.

FIG. 8B illustrates another embodiment of a nonlinear transformation (e.g., to FIG. 8A) using a filter bank 71 or sub-bands. The filter bank 71 divides a (voice) audio spectrum into multiple parts or portions. Each portion includes a narrow band of frequencies (e.g., <100 Hz, typically 10 Hz to 50 Hz of bandwidth), which is then coupled to a non linear transformation system or circuit to provide harmonic(s) from one or more of the signals from the sub-bands. By dividing an audio spectrum into a set of smaller spectrums and coupling them to individual harmonic generators, intermodulation distortion is reduced or eliminated substantially in the signal provided from the output of the non linear transformation function.

For example, suppose two signals within a wider band spectrum includes $\sin(\omega 1)t+\sin(\omega 2)t$, which is then coupled to a second harmonic generator or squaring function. The resulting frequencies from the output of the squaring function are: $(\omega 1-\omega 2)$, $(\omega 1+\omega 2)$, which are intermodulation product frequencies that are not desirable, and the desirable harmonic frequencies $2\omega 1$, $2\omega 2$.

Now suppose that each sinusoidal signal $\sin(\omega 1)t$ and $\sin(\omega 2)t$ are filtered by two band pass filters, one band pass filter passing at frequency $\omega 1$, and another band pass filter passing the signal at $\omega 2$. For each output of the two band pass filters, the signals are individually coupled to separate harmonic generators (e.g., squaring circuit). Then a first squaring circuit or function provides a signal of frequency $2\omega 1$, and a second squaring circuit or function provides a signal of frequency $2\omega 2$. A combining circuit receiving the outputs of the individual harmonic generators then outputs the desired signal of frequencies $2\omega 1$ and $2\omega 2$. The combining circuit may include a filter to remove low frequency signals (e.g., signals below the spectrum of the voice spectrum).

FIG. 8B thus illustrates the filter bank 71, or multiple band pass filters, which provide sub bands of an audio spectrum or voice audio spectrum of two or more center frequencies. Thus, two or more outputs of the band pass filters, e.g., of the filter bank 71, are coupled to two or more harmonic generators or non linear transformation systems 72. The outputs of the two or more harmonic generators, or non linear transformations system 72, are coupled to two or more filters in the system 72, to provide one or more harmonics from the signals of two or more band pass filters. The harmonics from $1^{st}$ harmonic to Nth harmonic may be scaled with a gain factor or scaling function. The output of system 72 is coupled to a combiner 73 which sums harmonics and or fundamental frequencies from two or more sub bands of the voice or audio spectrum. The output of the combiner 73 may be coupled via a summing function 74 to a speech recognition processor 75, for conversion of speech to text.

Alternatively, any portion or all of the voice and/or audio spectrum provided via filter bank 71 may be combined with weighted sums of harmonics of two or more sub bands (as illustrated by a dashed line 76), to provide an audio signal for the speech recognition processor 75 for conversion to text.

Figures 9A, 9B:
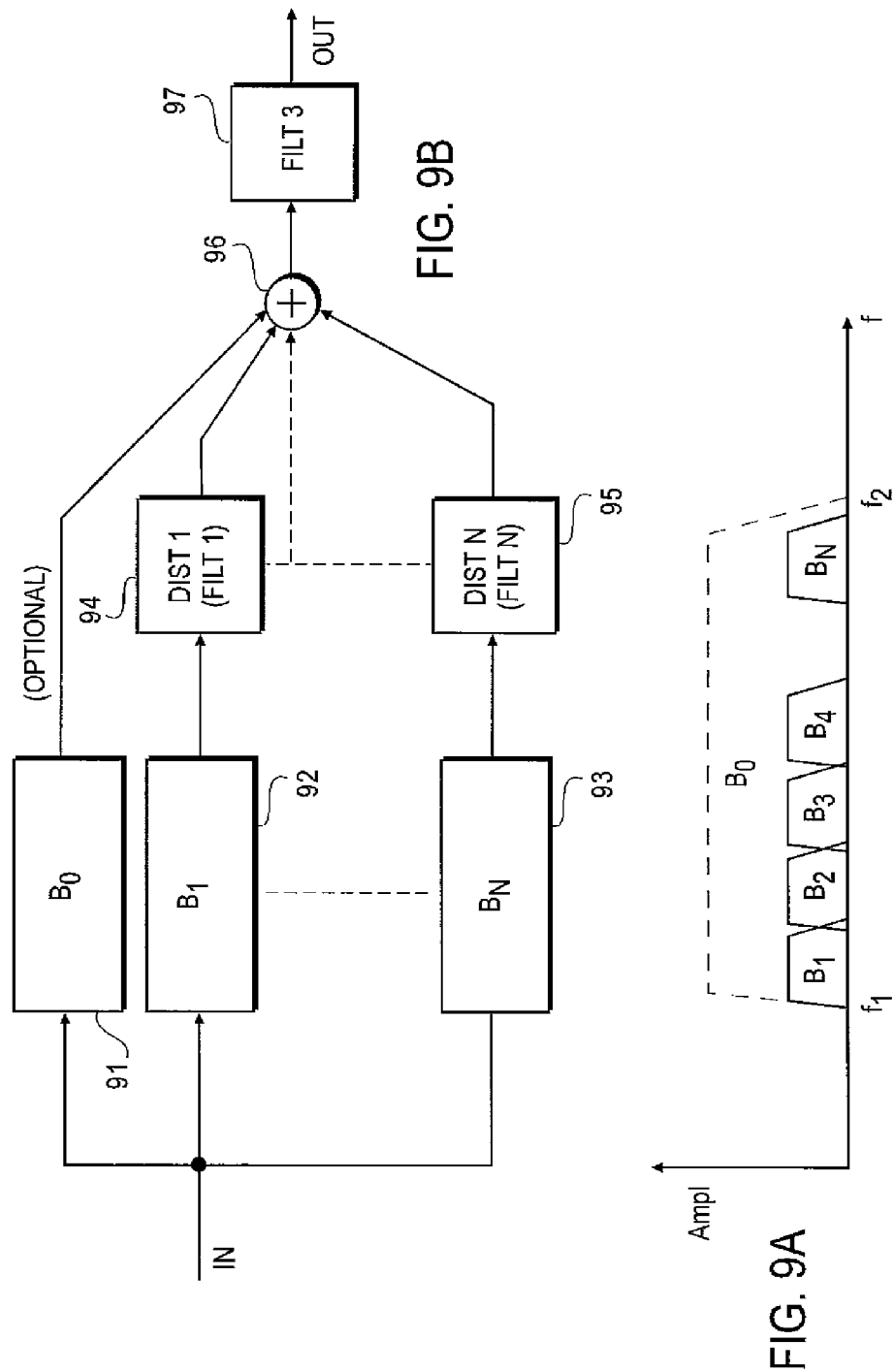
FIG. 9A is a graph of an example of a frequency response or spectrum using one or more filters.
FIG. 9B is a block diagram illustrating an embodiment of the invention including one or more distortion or nonlinear transformations.

FIG. 9A is a graph illustrating an example of dividing a frequency spectrum, whose bounds are f1 and f2 with sub-bands B1, B2, B3, B4, . . . BN, where N=number of sub-bands. B0 in dotted line may represent substantially the total spectrum from B1 through BN. Example frequencies for f1 and f2 (frequency range of B0) are: 150 Hz and 400 Hz, or 100 Hz and 300 Hz, respectively. In an example where N=5, the sub bands may include B1=150 Hz to 200 Hz, B2=200 Hz to 250 Hz, B3=250 Hz to 300 Hz, B4=300 Hz to 350 Hz, and B5=350 Hz to 400 Hz, and with B0=250 Hz. Of course, other numbers for N, f1, f2, and or Bi (where the index i is an element of non negative integers) may be used. An objective for dividing a spectrum (e.g., audio voice spectrum) into sub-bands is to allow for one or more sub-bands to be coupled to a distortion generation system, or non linear transformation, such that substantially harmonic distortion is produced while minimizing intermodulation distortion. The harmonic distortion provided via the sub-bands allows a band limited (audio frequency) spectrum, which is normally unintelligible to hearing or to a speech recognition system, but allows greater separation between voice information and music, to produce missing harmonics of the wider bandwidth or voice frequency spectrum.

For example, the voice frequency spectrum is typically 150 Hz to 2500 Hz. By filtering a small portion of the voice frequency spectrum such as 150 Hz to 300 Hz, this small portion of the voice frequency spectrum would normally be too muffled sounding or unintelligible to allow recovery by a voice recognition system. By using the sub-band technique with multiple filters and distortion generators, the missing harmonics from 300 Hz to about 2500 Hz are provided. These generated missing harmonics (300 to 2500 Hz) combined with the 150 Hz to 300 Hz spectrum, provides intelligibility and or voice recognition by the recognition system for conversion into text.

FIG. 9B illustrates an exemplary system for generating harmonics while minimizing intermodulation distortion. A signal (analog, digital or discrete time) is coupled to a filter bank comprised of one or more of: B0, B1 BN, as noted by filters 91, 92 and or 93. The output of one or more filters from B1 through BN is coupled to one or more distortion generating systems or non linear transformations (DIST1 ... DISTN) as noted by numerals 94 and 95. The distortion generating systems or non linear transformations may each provide one or more harmonics from the sub band filter (bank) and may include a filter (high pass, low pass, band eject, and or band pass characteristic) to further remove extraneous signals, unrelated to the harmonic frequency. The one or more outputs from the distortion generators or non linear transformations are combined via a summing circuit or function 96. For voice recognition and or intelligibility, the fundamental frequencies are not always required, and harmonics above 250 Hz to 300 Hz are sufficient. Thus, the combining circuit or function 96 may receive outputs only from the harmonic generators or nonlinear transformations. Alternatively, the summing circuit or function 96 may receive an output from filter 91 (B0) of fundamental frequencies (e.g., of voice frequencies) and one or more outputs of harmonic generators or non linear transformations. The output of the summing circuit 96 may be coupled to a filter 97 for shaping the "voice" frequency (e.g., equalizing frequencies) or for further removal of signals whose frequencies undesirably hamper voice recognition or intelligibility. For example, removal of low frequency distortion signals that are out of the band pass of any filter B0 through BN. The output of optional filter 97 or summing circuit or function 96 may be coupled to a voice recognition system, for example, for conversion of audio signals to text.

Figure 9C:
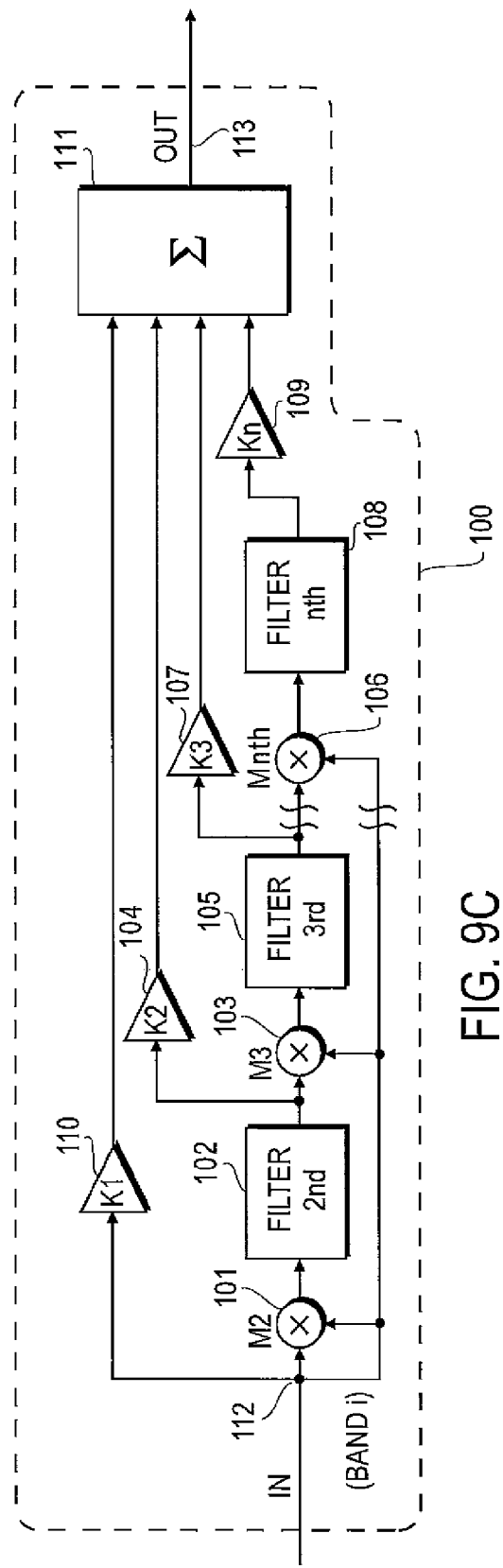
FIG. 9C is a block diagram illustrating nonlinear transformation.

FIG. 9C illustrates an exemplary nonlinear transformation function, system, and or circuit 100. A band of frequencies supplied via a filter or filter bank is coupled via a terminal 112 to both inputs of a multiplier 101 (M2), which provides sum and difference frequency signals of the input signal. The output of the multiplier 101, is coupled to a filter 102, which passes the second harmonic signals from the input signal supplied at terminal 112. The output of filter 102 is coupled to a scalar function 104 (K2) which may include phase shifting and or attenuation or gain of the signal. Thus a scaled and or phase shifted version of the second harmonic of the input signal is coupled to a combining function or circuit 111 along with a scaled version of the input signal via a scalar function 110 (K1), that includes the fundamental frequencies, which also are coupled to the combining function or circuit 111.

To provide higher order harmonics, the process is substantially repeated with one or more mixers, multipliers, and/or modulators. For example, to provide a third harmonic signal from the input signal, the output of the second harmonic filter 102 is coupled to a first input of a multiplier 103. The second input of multiplier 103 is coupled via terminal 112 to the input signal, wherein the signal includes the fundamental frequencies. The output of the multiplier (mixer) 103 then includes a third harmonic signal, which is passed via a third harmonic filter 105. The output of filter 105 is then coupled to a scaling function 107 (K3), whose output in turn is coupled to the combining function or circuit 111.

Similarly, an nth multiplier (mixer) is used to provide an nth harmonic frequency of the input signal. For example, the (n−1)th harmonic from a series of filters and mixer/multipliers is coupled to a first input of an nth multiplier/mixer 106. The second input of the nth multiplier/mixer 106 is coupled to the input signal, whereby the output of the nth mitiplier/mixer 106 includes an nth harmonic of the input signal along with other distortion products. The output of the multiplier/mixer 106 is coupled to the input of an nth harmonic filter 108. The output of the filter 108 is scaled via a scaling function 109 (Kn), to supply gain, attenuation and or phase shift to the combining function or circuit 111. It follows that the output 113 of the combining function or circuit 111 then includes any combination of fundamental and or harmonics of the input signal (e.g., as determined by scaling coefficients Ki, where the index denoted by "i" is an element of positive integers).

Figure 9D:
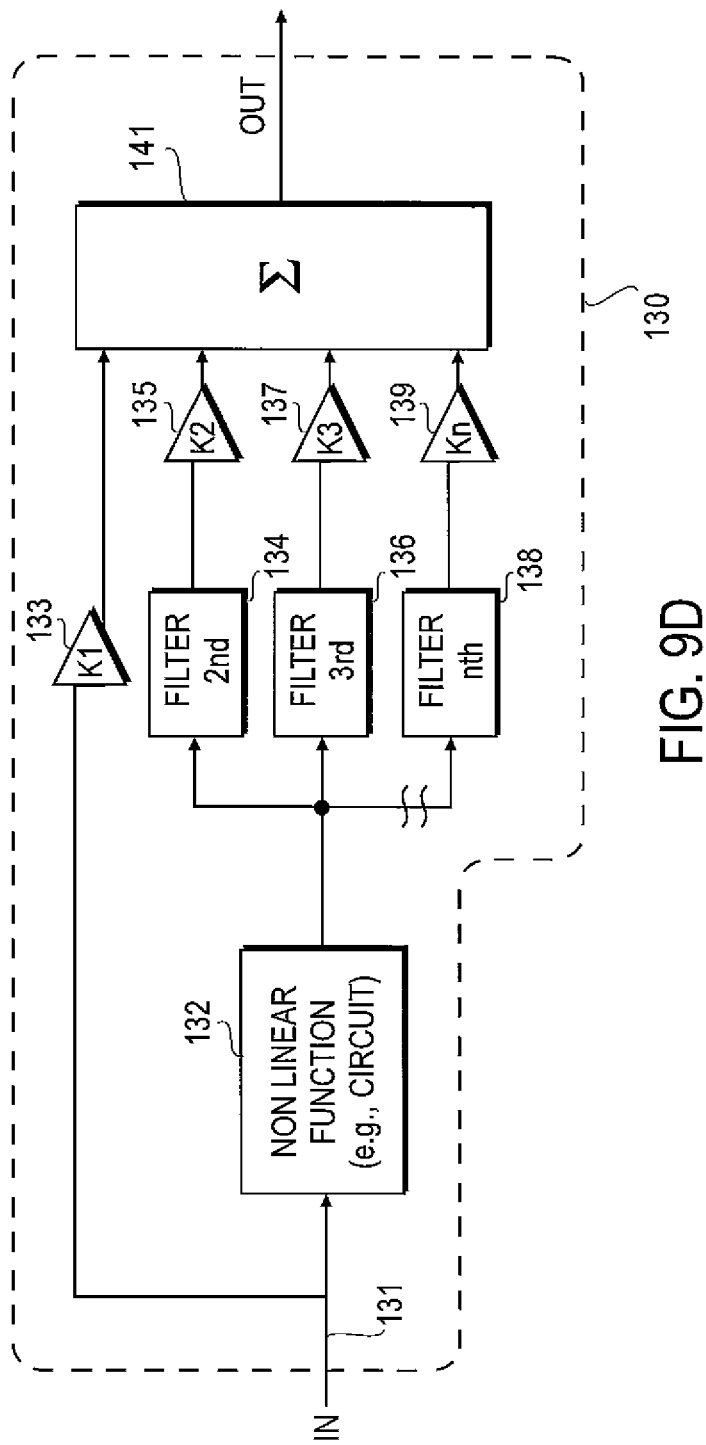
FIG. 9D is a block diagram illustrating another example of nonlinear transformation.

FIG. 9D shows another example of a nonlinear transformation system 130 utilizing a nonlinear function/circuit 132 such as a system including one or more circuits, transistors, and or diodes. An input signal 131 is coupled to the nonlinear function/circuit 132, which produces one or more harmonics of the input frequencies of signal 131. The output of nonlinear function/circuit 132 is coupled to one or more filters 134, 136, and or 138, to provide one or more harmonics. Scaling or phase shifting is provided by scaling functions 135, 137, and or 139 of any combination of second order to nth order harmonics. The output(s) of the scaling function(s) or circuits) is coupled to a combining function or circuit 141, and the output thereof includes a scaled version of the fundamental frequency of the input signal and or any harmonic of the input signal.

Figure 9E:
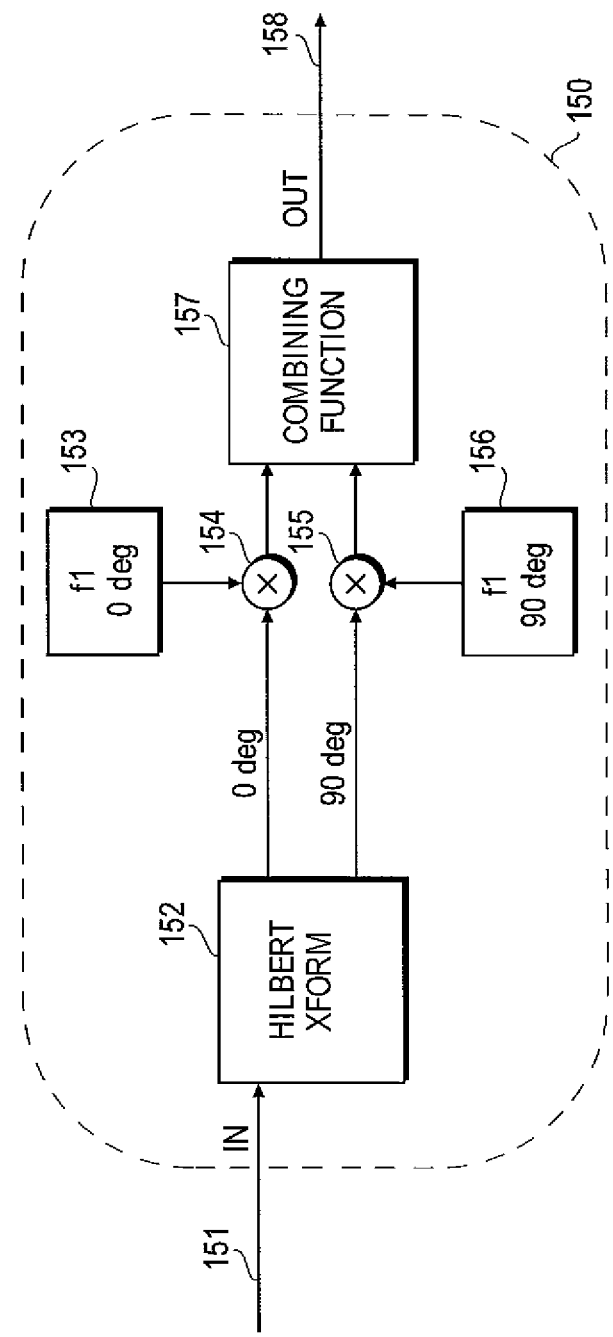
FIG. 9E is a block diagram illustrating frequency translation transformation.

FIG. 9E shows an exemplary embodiment for frequency translation of an input signal. This frequency translation may move or shift the spectrum of the input signal upward or downward. For example, the frequency translation effect can alter the pitch of an audio input signal to a higher or lower pitch. FIG. 9E provides multiplication of signals for frequency translation purposes using the following trigonometric identities: $\cos(u+v)=[\cos(u)][\cos(v)]-[\sin(u)][\sin(v)]$, $\cos(u-v)=[\cos(u)][\cos(v)]+[\sin(u)][\sin(v)]$, and or $\cos(x)=\cos(-x)$, $\sin(-x)=-\sin(x)$. For an example, a zero (0) phase signal may be denoted by a cosine function, and a 90 degree phase shifted signal may be denoted by a sine function (or vice versa depending on whether a plus or minus 90 degrees shift is implemented).

Accordingly, in FIG. 9E, a band limited signal, (e.g., input signal's frequency spectrum>=100 Hz) is coupled via an input terminal 151, to a phase shifting function, or equivalently, a Hilbert Transform system 152. The output of phase shifting (Hilbert) system 152 provides 0 degrees and 90 degrees phase versions of the input signal. One output of the system 152 is coupled to a first input of a multiplier/mixer 154. The other input of multiplier/mixer 154 is coupled to a generator 153 whose frequency, determines or provides frequency translation of the input signal. It is noted that the phase of the frequency f1 for generator 153 is at 0 degrees. The output of the multiplier/mixer 154 is coupled to a combining function/circuit/system 157. A 90 degrees output of the phase shifting (Hilbert) system 152 is coupled to a first input of another multiplier/mixer 155. A second input of multiplier/mixer 155 is coupled to a 90 degrees phase shifted signal of an f1 generator 156. The output of the multiplier/mixer 156 is coupled to the combining function/circuit 157.

Referring back to the trigonometric identities above, it is observed that an upward frequency translation of the input signal is provided by setting the combining function/circuit 157 as a subtraction function of the outputs of multipliers/mixers 154 and 155. Alternatively, a downward frequency translation of the input signal is provided by setting the combining function/circuit 157 as an addition function of the output of the multipliers/mixers 154 and 155. The output terminal 158 of combining function/circuit 157 provides frequency translation of the input signal's spectrum. It should be noted that the input signal's spectrum does not have frequency components to 0 Hertz or DC (Direct Current). The apparatus in FIG. 9E allows for downward frequency shift of the input signal, without shifting the input signal spectrum's frequency to DC or "wrapped" around frequencies near DC, which would cause possible distortion. For example, if the input spectrum has frequencies greater than 150 Hz, then the frequency f1 may be set to 100 Hz to shift the input spectrum down by 100 Hz, resulting in a new spectrum that is greater than or equal to 50 Hz (150 Hz-100 Hz).

Another implementation of the method and apparatus of FIG. 9E may be achieved by Weaver Modulation (e.g., for single sideband generation) to avoid using the Hilbert Transform system 152 by utilizing additional multipliers/mixer and filters.

Figure 9F:
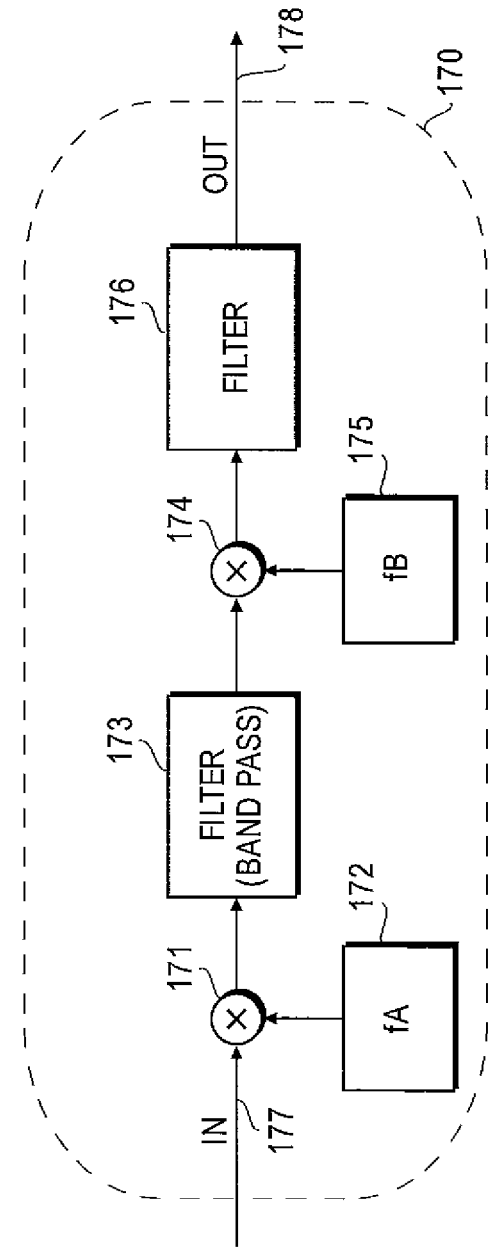
FIG. 9F is a block diagram illustrating another example of frequency translation transformation.

The system of FIG. 9F provides frequency translation transformation by relying on product to sum trigonometric identities. One such identity is:

$$[\cos(u)][\cos(v)]=0.5[\cos(u-v)+\cos(u+v)],$$

which results when two signals of frequencies u and v are multiplied, where sum and difference frequencies, (u+v) and (u−v) are produced. A typically band limited signal is coupled via an input 177 to a first input of a multiplier/mixer 171. A second input of multiplier/mixer 171 is coupled to a generator or equivalent function for providing a frequency fA. The output of multiplier/mixer 171 then includes the sum and difference frequencies of the input signal's spectrum and frequency fA from the generator 172. A filter such as a band pass filter 173 passes the sum frequencies, such as the input signal's frequencies fA, to a first input of a second multiplier/mixer 174. A second input of multiplier/mixer 174 is coupled to a generator or function 175 with frequency fB. The output of the multiplier/mixer 174 is coupled to a second filter 176 to provide a difference frequency spectrum such as: the input signal's frequencies (fA−fB). Depending on the selection of fA and fB, the (difference) frequency (fA−fB) may translate up the input frequency spectrum if fA>fB, or translate down the input frequency spectrum if fA<fB. Ergo, the output of filter 176 provides a shifted frequency spectrum of the input signal (e.g., up or down) depending on the selection frequencies fA and fB.

It should be noted that any combination of frequency translation, filter banks, and or distortion generation (for any audio signal) provides a method and apparatus for processing audio signals for speech recognition purposes. Speech recognition may include speech to text conversion, which subsequently may be used for identification of movies or video/audio programs. Alternatively any combination of processing of an audio and or video signal via any of the following processes may be used for identification: frequency translation, filter banks, distortion generation, closed caption information, DVS audio signal converted to text, DVS audio signal Fourier Transform including DCT, STFT, or Wavelet Transform, AC-3 audio signal frequency analysis, time code, histogram, Radon Transform of video signals, rendering of video signals, SAP audio signal (spectrum analysis and or speech to text conversion), teletext, and or movie scripts.

An example embodiment of the invention includes: A system for improving speech recognition of a speech to text converter comprising; coupling an audio signal to an input of a band pass filter, wherein the band pass filter provides a band limited spectrum of the audio signal, coupling an output of the band pass filter to an input of a frequency translation circuit or function, wherein an output of the frequency translation circuit or function shifts the band limited spectrum of the audio up or down, and further coupling the output of the frequency translation circuit or function to a speech to text converter to provide improved speech recognition of the band limited spectrum of the audio signal.

Another embodiment of the invention includes: a system for improving speech recognition of a speech to text converter comprising; coupling an audio signal to an input of a band pass filter system, wherein the band pass filter system provides one or more band limited spectrums of the audio signal, coupling an output of the band pass filter system to an input of a distortion generation system and coupling an output of the distortion generation system to an input of a frequency translation circuit or function, wherein an output of the frequency translation circuit or function shifts the band limited spectrum of the audio up or down, and further coupling the output of the frequency translation circuit or function to a speech to text converter to provide improved speech recognition of the band limited spectrum of the audio signal.

Yet another embodiment of the invention includes: A system for improving speech recognition of a speech to text converter comprising; coupling an audio signal to an input of a frequency translation circuit or function, wherein an output of the frequency translation circuit or function shifts a spectrum of the audio signal up or down, further coupling the output of the frequency translation circuit or system to an input of a band pass filter system, wherein the band pass filter system provides one or more band limited spectrums of the audio signal, coupling an output of the band pass filter system to an input of a distortion generation system and coupling an output of the distortion generation system to a speech to text converter to provide improved speech recognition of the audio signal.

A further embodiment of the invention includes: A system for processing an input signal comprising; coupling the input signal to an input of a filter bank comprising two or more filters, wherein the output of the filter bank includes two or more outputs, a first output, a second output, and or an nth output, further comprising coupling the first output, second output, and or the nth output to one or more inputs of non linear transformations, wherein the one or more outputs of the one or more non linear transformations provides one or more harmonics of the input signal via the first, second, or nth output of the filter bank, further comprising scaling and or combining two or more outputs of the non linear transformations to provide a processed signal.

Any of the embodiments described in relation to the FIGS. 6A through 9F may by applied for identifying purposes, such as in the processing function 9 of FIG. 1, for any audio track providing SAP, sound track, and or DVS signals, which may be used in combination with other identifying techniques and or methods described previously in any FIGS. 1 through 5D.

Figure 10:
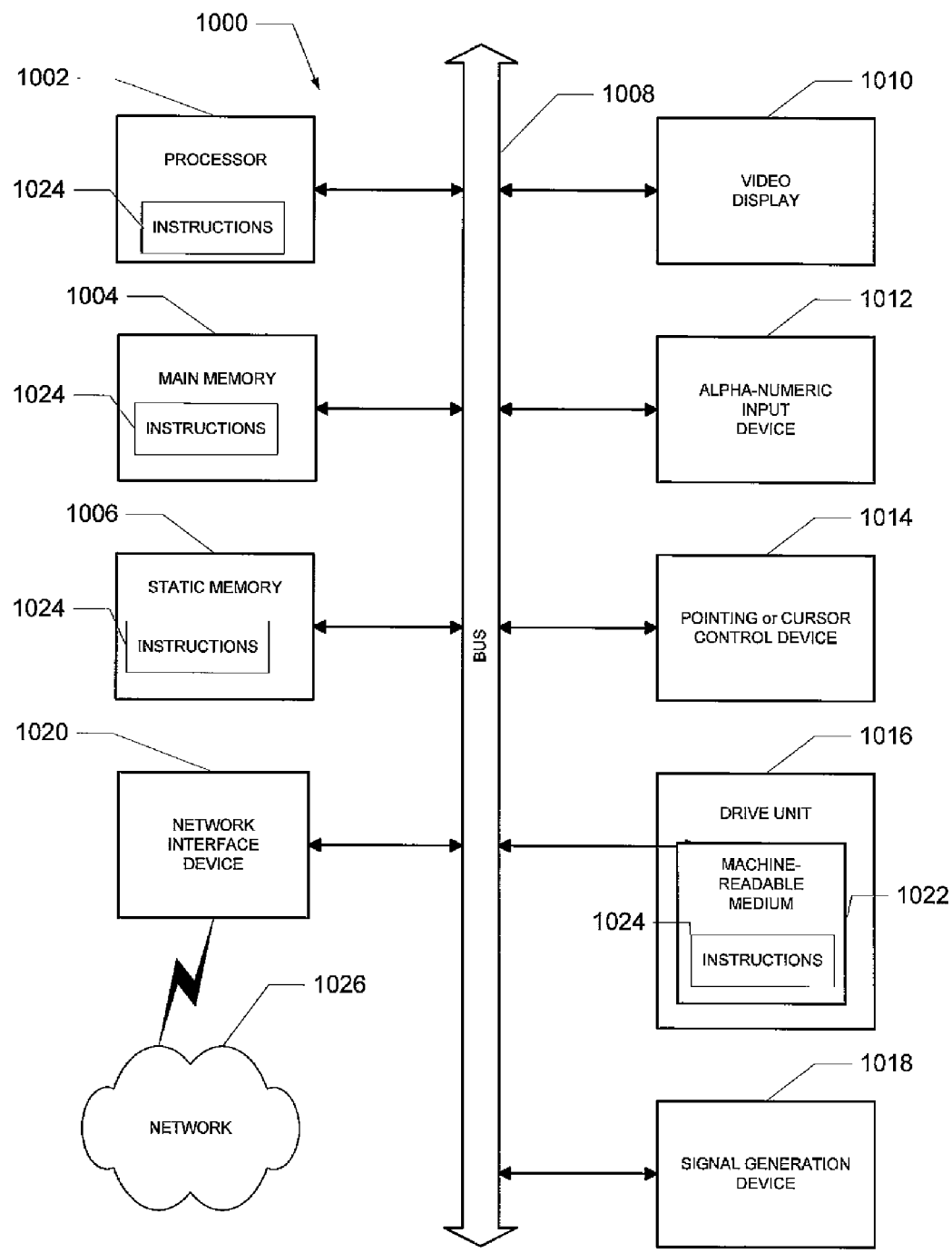
FIG. 10 shows a diagrammatic representation of a machine in the form of a computer system within which a set of instructions, for causing the machine to perform any one or more of the methodologies discussed herein, may be executed, according to an example embodiment.

FIG. 10 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be coupled, e.g., networked, to other machines. In a networked deployment, the machine may operate in the capacity of a server or a client machine in client-server network environment, or as a peer machine in a peer-to-peer and/or distributed network environment. The machine may be a server computer, a client computer, a personal computer (PC), a tablet PC, a set-top box (STB), a Personal Digital Assistant (PDA), a cellular telephone, a web appliance, an audio or video player, a network router, switch or bridge, or any machine capable of executing a set of instructions, sequential or otherwise, that specify actions to be taken by that machine. Further, while a single machine is illustrated, the term "machine" shall also be taken to include any collection of machines that individually or jointly execute a set, or multiple sets, of instructions to perform any one or more of the methodologies discussed herein.

The example computer system 1000 includes a data processor 1002, e.g., a central processing unit (CPU), a graphics processing unit (GPU), or both, a main memory 1004 and a static memory 1006, which communicate with each other via a bus 1008. The computer system 1000 may further include a video display unit 1010, e.g., a liquid crystal display (LCD), a cathode ray tube (CRT), or other imaging technology. The computer system 1000 also includes an input device 1012, e.g., a keyboard, a pointing device or cursor control device 1014, e.g., a mouse, a disk drive unit 1016, a signal generation device 618, e.g., a speaker, and a network interface device 1020.

The disk drive unit 1016 includes a non-transitory machine-readable medium 1022 on which is stored one or more sets of instructions and data, e.g., software 1024, embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system, e.g., a standalone, client or server computer system, configured by an application may constitute a "module" that is configured and operates to perform certain operations as described herein. In other embodiments, the "module" may be implemented mechanically or electronically. For example, a module may comprise dedicated circuitry or logic that is permanently configured, e.g., within a special-purpose processor, to perform certain operations. A module may also comprise programmable logic or circuitry, e.g., as encompassed within a general-purpose processor or other programmable processor, that is temporarily configured by software to perform certain operations. It will be appreciated that the decision to implement a module mechanically, in the dedicated and permanently configured circuitry, or in temporarily configured circuitry, e.g. configured by software, may be driven by cost and time considerations. Accordingly, the term "module" should be understood to encompass an entity that is physically or logically constructed, permanently configured, e.g., hardwired, or temporarily configured, e.g., programmed, to operate in a certain manner and/or to perform certain operations described herein. While the machine-readable medium 1022 is shown in an example embodiment to be a single medium, the term "machine-readable medium" should be taken to include a single medium or multiple media, e.g., a centralized or distributed database, and/or associated caches and servers that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media, and/or magnetic media. As noted, the software may be transmitted over a network by using a transmission medium. The term "transmission medium" shall be taken to include any non-transitory medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

The system of an example embodiment may include software, information processing hardware, and various processing steps, which are described herein. The features and process steps of example embodiments may be embodied in articles of manufacture as machine or computer executable instructions. The instructions can be used to cause a general purpose or special purpose processor, which is programmed with the instructions to perform the steps of an example embodiment. Alternatively, the features or steps may be performed by specific hardware components that contain hardwired logic for performing the steps, or by any combination of programmed computer components and custom hardware components. While embodiments are described with reference to the Internet, the method and system described herein is equally applicable to other network infrastructures or other data communications systems.

Various embodiments are described herein. In particular, the use of embodiments with various types and formats of user interface presentations and/or application programming interfaces may be described. It can be apparent to those of ordinary skill in the art that alternative embodiments of the implementations described herein can be employed and still fall within the scope of the claimed invention. In the detail herein, various embodiments are described as implemented in computer-implemented processing logic denoted sometimes herein as the "Software". As described above, however, the claimed invention is not limited to a purely software implementation.

This disclosure is illustrative and not limiting. For example, an embodiment need not include all blocks illustrated in any of the figures. A subset of block(s) within any figure may be used as an embodiment. Further modifications will be apparent to those skilled in the art in light of this disclosure and are intended to fall within the scope of the appended claims.

What is claimed is:

1. A system for improving speech recognition of a speech to text converter comprising:
   a frequency translator for receiving an audio signal, wherein an output of the frequency translator shifts a spectrum of the audio signal up or down;
   a band pass filter coupled to the output of the frequency translator, wherein the band pass filter provides one or more band limited spectrums of the audio signal;
   a distortion generator coupled to an output of the band pass filter;
   a speech to text converter coupled to an output of the distortion generator to provide improved speech recognition of the audio signal;
   means for receiving a video signal and providing a frequency transformation of DVS, SAP, and or LFE audio signals; and
   means for comparing the frequency transformation of the DVS, SAP, and or LFE audio signals to a reference data base of DVS, SAP, and LFE audio signals for identifying the video signal.

2. A system for improving speech recognition of a speech to text converter comprising:
   a frequency translator for receiving an audio signal, wherein an output of the frequency translator shifts a spectrum of the audio signal up or down;
   a band pass filter coupled to the output of the frequency translator, wherein the band pass filter provides one or more band limited spectrums of the audio signal;
   a distortion generator coupled to an output of the band pass filter;
   a speech to text converter coupled to an output of the distortion generator to provide improved speech recognition of the audio signal;
   a database of rendered movies or video programs which are compared to a received video program material that is rendered for identifying the video program material; and
   wherein a gradient or Laplacian transform provides the function of rendering.

3. A system for improving speech recognition of a speech to text converter comprising:
   a band pass filter receiving an audio signal, wherein the band pass filter provides a band limited spectrum of the audio signal;
   a frequency translator coupled to an output of the band pass filter, wherein an output of the frequency translator shifts the band limited spectrum of the audio signal up or down;
   a speech to text converter coupled to the output of the frequency translator to provide improved speech recognition of the band limited spectrum of the audio signal;
   means for receiving a video program and providing a frequency transformation of DVS, SAP, and or LFE audio signals; and
   means for comparing the frequency transformation of the DVS, SAP, and or LFE audio signals to a reference data base of DVS, SAP, and LFE audio signals for identifying the video program.

4. The system of claim 3 further comprising:
   a time code reader for providing time code from a video signal, wherein the time code is associated with the words from a sound track channel, and wherein a comparing module further compares time code and text from the video program with a reference database for identification of the video program.

5. The system of claim 3 further comprising:
   a processor to provide Closed Caption information from a video program, wherein the Closed Caption information from the video program is compared to a reference data base of Closed Caption information for identifying the video program.

6. A system for improving speech recognition of a speech to text converter comprising:
   a band pass filter receiving an audio signal, wherein the band pass filter provides a band limited spectrum of the audio signal;
   a frequency translator coupled to an output of the band pass filter, wherein an output of the frequency translator shifts the band limited spectrum of the audio signal up or down;
   a speech to text converter coupled to the output of the frequency translator to provide improved speech recognition of the band limited spectrum of the audio signal;
   a database of rendered movies or video programs which are compared to a received video program material that is rendered for identifying the video program material; and
   wherein a gradient or Laplacian transform provides the function of rendering.

* * * * *